United States Patent
Ohishi et al.

(10) Patent No.: US 10,671,128 B2
(45) Date of Patent: Jun. 2, 2020

(54) INFORMATION PROCESSING APPARATUS

(71) Applicant: FUJITSU CLIENT COMPUTING LIMITED, Kawasaki-shi, Kanagawa (JP)

(72) Inventors: Shintaro Ohishi, Kawasaki (JP); Kohhei Nakajima, Kawasaki (JP); Hiroyuki Fujita, Kawasaki (JP); Masuo Ohnishi, Kawasaki (JP)

(73) Assignee: FUJITSU CLIENT COMPUTING LIMITED (JP)

( * ) Notice: Subject to any disclaimer, the term of this patent is extended or adjusted under 35 U.S.C. 154(b) by 0 days.

(21) Appl. No.: 16/438,898

(22) Filed: Jun. 12, 2019

(65) Prior Publication Data

US 2019/0294212 A1 Sep. 26, 2019

Related U.S. Application Data

(63) Continuation of application No. PCT/JP2017/002408, filed on Jan. 24, 2017.

(51) Int. Cl.
*G06F 1/16* (2006.01)

(52) U.S. Cl.
CPC ............... *G06F 1/166* (2013.01); *G06F 1/16* (2013.01); *G06F 1/1626* (2013.01); *G06F 1/1632* (2013.01); *G06F 1/1643* (2013.01); *G06F 1/1647* (2013.01); *G06F 1/1688* (2013.01); *G06F 1/1698* (2013.01)

(58) Field of Classification Search
None
See application file for complete search history.

(56) References Cited

U.S. PATENT DOCUMENTS

| | | | | |
|---|---|---|---|---|
| 9,025,321 | B2* | 5/2015 | Liang | G06F 1/1669 361/679.01 |
| 9,195,265 | B1* | 11/2015 | Jackson | G06F 1/1611 |
| 9,778,703 | B2* | 10/2017 | Senatori | G06F 1/1616 |
| 2005/0135049 | A1* | 6/2005 | Huang | G06F 1/1632 361/679.09 |
| 2008/0085736 | A1 | 4/2008 | Kitamura et al. | |
| 2012/0194977 | A1* | 8/2012 | Liu | G06F 1/162 361/679.01 |
| 2012/0287562 | A1* | 11/2012 | Wu | G06F 1/1626 361/679.01 |

(Continued)

FOREIGN PATENT DOCUMENTS

JP 2005-182739 A 7/2005
JP 2006-024178 A 1/2006

(Continued)

OTHER PUBLICATIONS

International Search Report for Patent Application No. PCT/JP2017/002408 dated Apr. 11, 2017 (4 pages).

*Primary Examiner* — Jinhee J Lee
*Assistant Examiner* — Rashen E Morrison
(74) *Attorney, Agent, or Firm* — Harness, Dickey & Pierce, P.L.C.

(57) ABSTRACT

An information processing apparatus includes a plurality of stoppers that are provided on a keyboard and hold a display in a standing state in which the display is standing up with respect to the keyboard and to engage with the display in a closed state in which the display is closed.

11 Claims, 28 Drawing Sheets

(56) References Cited

U.S. PATENT DOCUMENTS

| | | | |
|---|---|---|---|
| 2013/0077216 A1* | 3/2013 | Lee | G06F 1/1616 |
| | | | 361/679.01 |
| 2013/0128453 A1 | 5/2013 | Lin | |
| 2014/0139987 A1 | 5/2014 | Onda | |
| 2016/0062484 A1 | 3/2016 | Sugiura et al. | |
| 2016/0154428 A1* | 6/2016 | Senatori | G06F 1/1616 |
| | | | 361/679.27 |
| 2019/0294212 A1* | 9/2019 | Ohishi | G06F 1/1632 |

FOREIGN PATENT DOCUMENTS

| | | |
|---|---|---|
| JP | 2008-118625 A | 5/2008 |
| JP | 2011-164818 A | 8/2011 |
| JP | 2013-025420 A | 2/2013 |
| JP | 2014-102576 A | 6/2014 |
| JP | 2016-051254 A | 4/2016 |
| JP | 2016-200898 A | 12/2016 |

* cited by examiner

INFORMATION PROCESSING APPARATUS

The application is a continuation application based on a PCT Patent Application No. PCT/JP2017/002408, filed Jan. 24, 2017. The entire content of the above PCT Application is incorporated herein by reference.

FIELD OF THE INVENTION

The technology disclosed in the present application relates to an information processing apparatus.

DESCRIPTION OF RELATED ART

A technology is known in which, when a lower edge of a support plate of a tablet personal computer (PC) case is locked in a groove of an upper surface of a base, a permanent magnet is provided on a lower edge portion of the support plate, and an object to be sucked is provided on an upper surface portion of the base such that the lower edge of the support plate is sucked by the upper surface of the base.

In addition, there is a technology in which a locking block is provided in a convex shape on an inner surface of a third plate body of a computer cover and the locking block includes at least two locking bars to lock a tablet PC in multiple stages such that the viewing angle can be adjusted.

SUMMARY OF THE INVENTION

In an information processing device in which a keyboard is mounted to a display such as a tablet PC, the display and the keyboard can have various relative positional relations. If the relative position between the display and the keyboard can be reliably maintained, the convenience of the information processing device will be improved.

An object of one aspect of the technology disclosed in the present application is to improve the convenience of an information processing device in which a keyboard is mounted to a display.

In order to achieve the above object, an information processing apparatus according to one aspect of the technology disclosed in the present application includes a plurality of stoppers provided on a keyboard, the plurality of stoppers being configured to hold the display in a standing state in which the display is standing up with respect to the keyboard and to engage with the display in a closed state in which the display is closed.

DETAILED DESCRIPTION OF THE INVENTION

Figure 1:
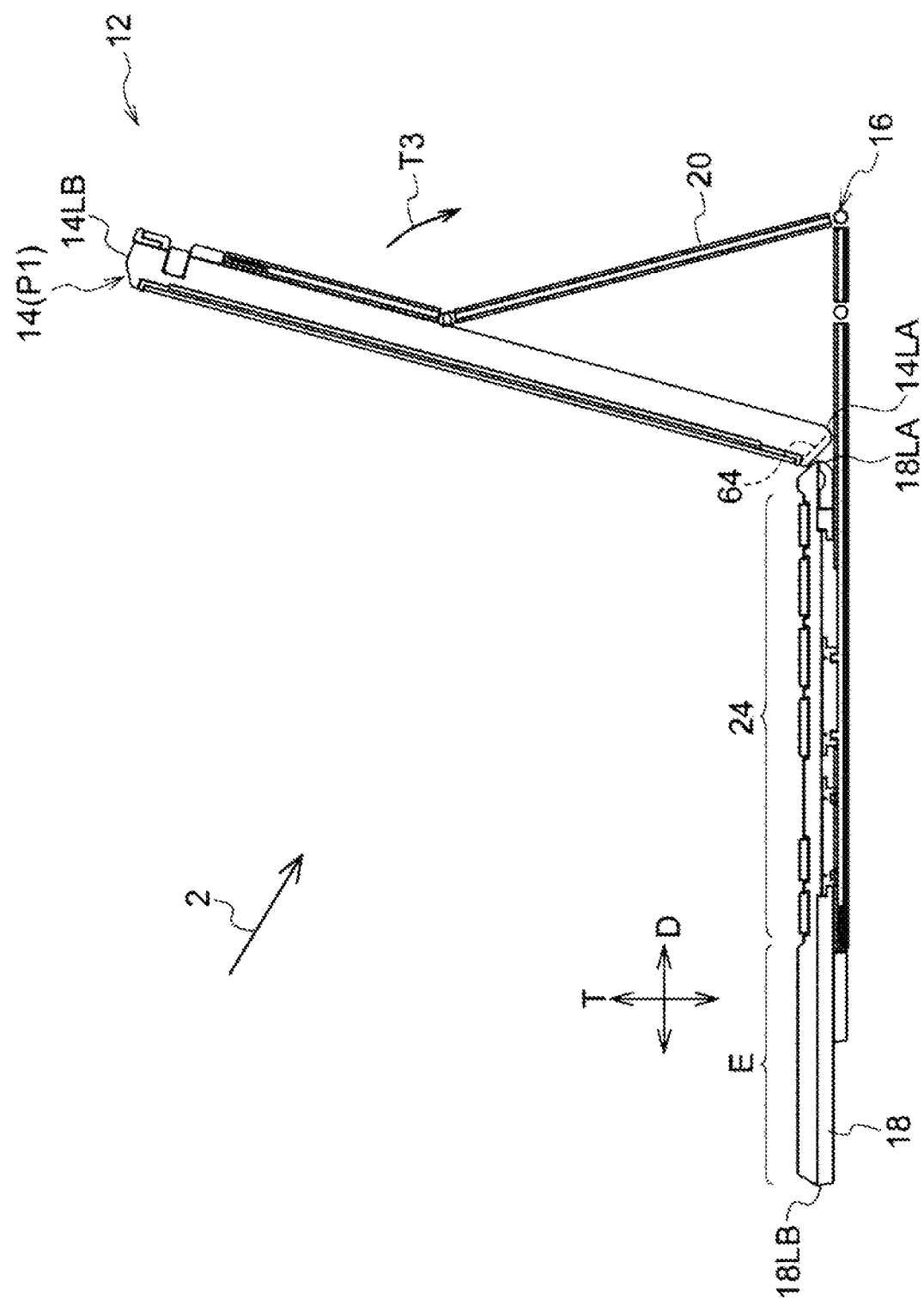
FIG. 1 is a side view showing a tablet computer and a keyboard dock as an example of an information processing apparatus of a first embodiment in an open state.

A first embodiment will be described in detail on the basis of the drawings.

As shown in FIGS. 1 to 10, an information processing apparatus 12 of the first embodiment has a tablet computer (hereinafter referred to as a "tablet") 14 and a keyboard dock 16. The keyboard dock 16 has a keyboard 18 and a connection plate 20 attached to the keyboard 18. The tablet 14 and the keyboard 18 are electrically connected to each other wirelessly or by wire, such that signals can be transmitted and received between the tablet 14 and the keyboard 18.

The tablet 14 is formed in a rectangular plate shape in the present embodiment. The tablet 14 has a display unit 21 (see FIG. 23) and a display screen 22 for displaying an image generated by the display unit 21. The tablet 14 is an example of a display. The tablet 14 internally has a processor, a memory, and the like.

In the present embodiment, the keyboard 18 is formed in a rectangular plate shape and has a plurality of input keys 26. By pressing an input key 26, it is possible to perform an input operation on the information processing apparatus 12. Hereinafter, a direction along long sides 18L of the keyboard 18 is referred to as a width direction and a direction along short sides 18S thereof is referred to as a depth direction. In the drawings, the width direction, the depth direction, and the thickness direction of the keyboard 18 are indicated by arrows W, D, and T, respectively. In the drawings, the center in the width direction of the keyboard 18 is indicated by a center line CL.

A plurality of input keys 26 are arranged in a key arrangement portion 24 of the keyboard 18 at predetermined positions in a predetermined order. That is, a range in which the plurality of input keys 26 are arranged at the predetermined positions in the predetermined order is the key arrangement portion 24.

In the present embodiment, the key arrangement portion 24 is located near a first long side 18LA which is one of the long sides of the keyboard 18.

A touchpad 28 is provided on the keyboard 18 in a range located between the key arrangement portion 24 and a second long side 18LB which is the other long side. By touching the touchpad 28, it is possible to perform an input operation on the information processing apparatus 12. Further, in the present embodiment, a predetermined image can be displayed on the touchpad 28, and the touchpad 28 is also an example of a second display screen 30. However, the touchpad 28 may also be a touchpad of a type that does not display images.

Figure 9:
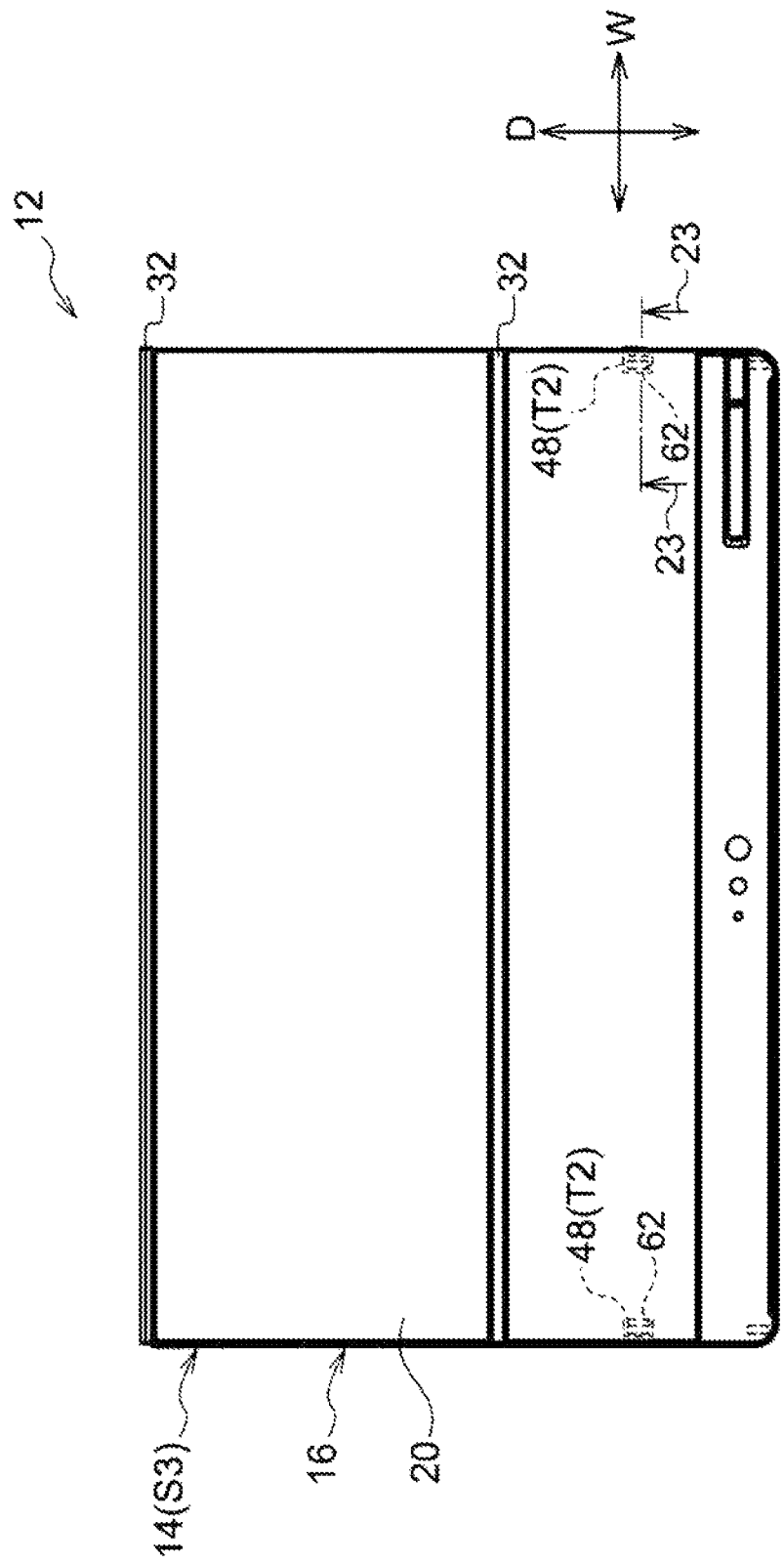
FIG. 9 is a plan view showing the tablet computer and the keyboard dock as an example of the information processing apparatus of the first embodiment in a closed state.
Figure 10:
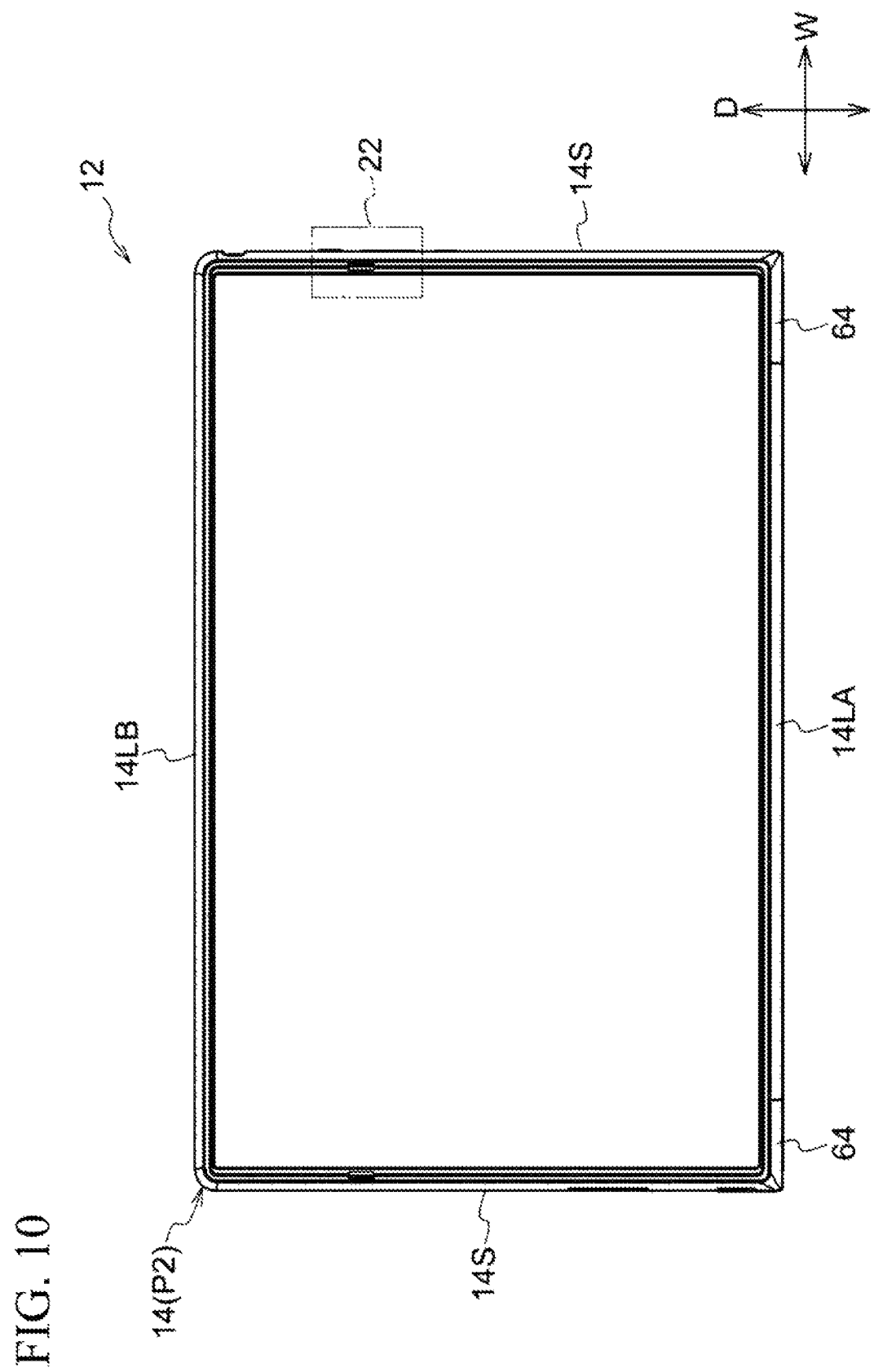
FIG. 10 is a plan view showing the tablet computer and the keyboard dock as an example of the information processing apparatus of the first embodiment in a slate state.
Figure 11:
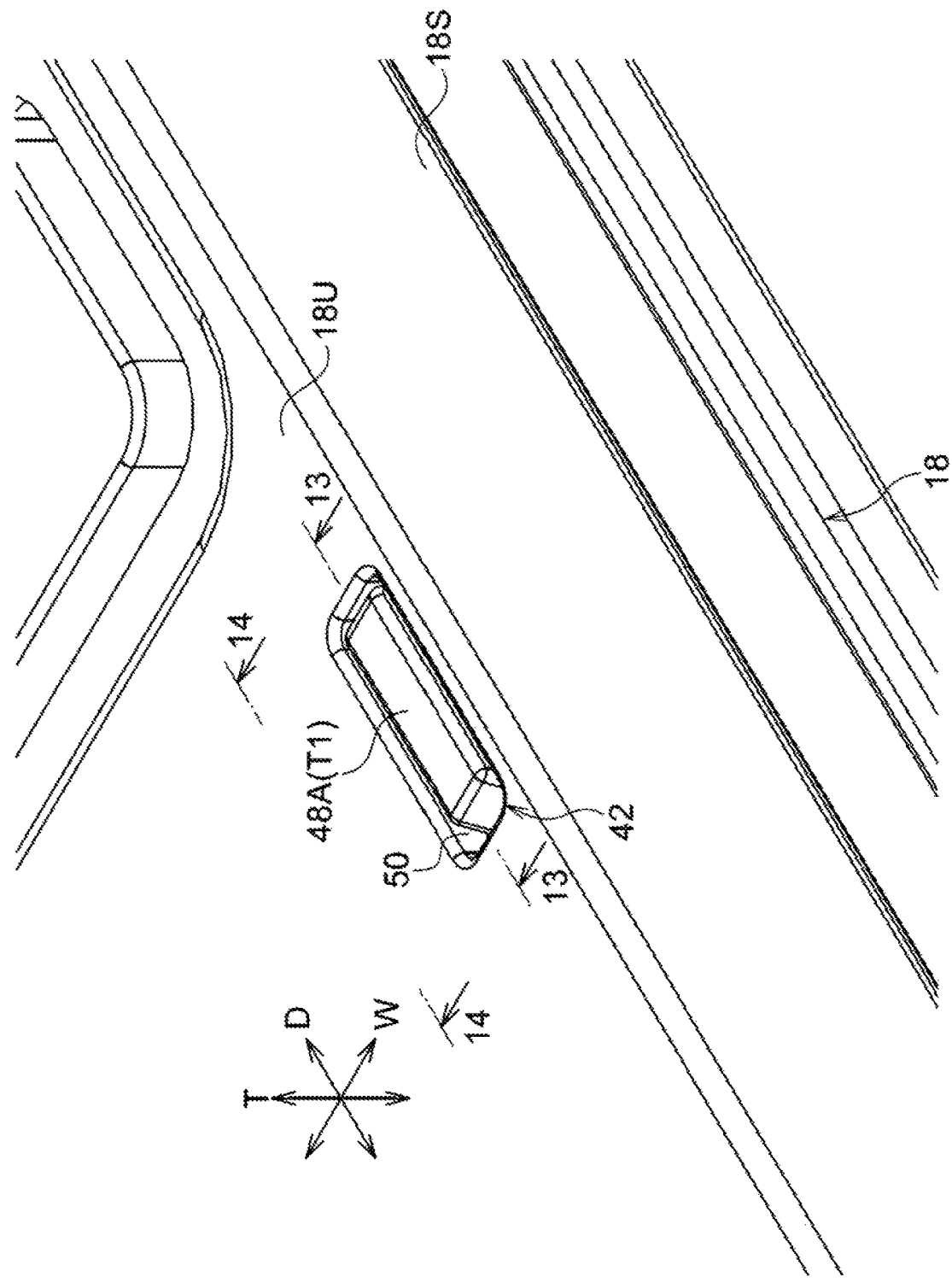
FIG. 11 is an enlarged perspective view showing the vicinity of a stopper which is at an accommodation position in the information processing apparatus of the first embodiment.

In the present embodiment, the shape of the tablet 14 in plan view matches the shape of the keyboard 18 in plan view. Thus, in a state in which the keyboard 18 and the tablet 14 overlap each other as shown in FIGS. 9 and 10, the outer shape of the keyboard 18 matches the outer shape of the tablet 14. It is to be noted that FIG. 9 shows a state in which the tablet 14 is superimposed on the keyboard 18 with the display screen 22 directed to face the keyboard 18, which is hereinafter referred to as a closed state. FIG. 10 shows a state in which the tablet 14 is superimposed on the keyboard 18 with the display screen 22 directed away from the keyboard 18, that is, with the display screen 22 directed to be exposed, which is hereinafter referred to as a slate state.

Figure 3A:
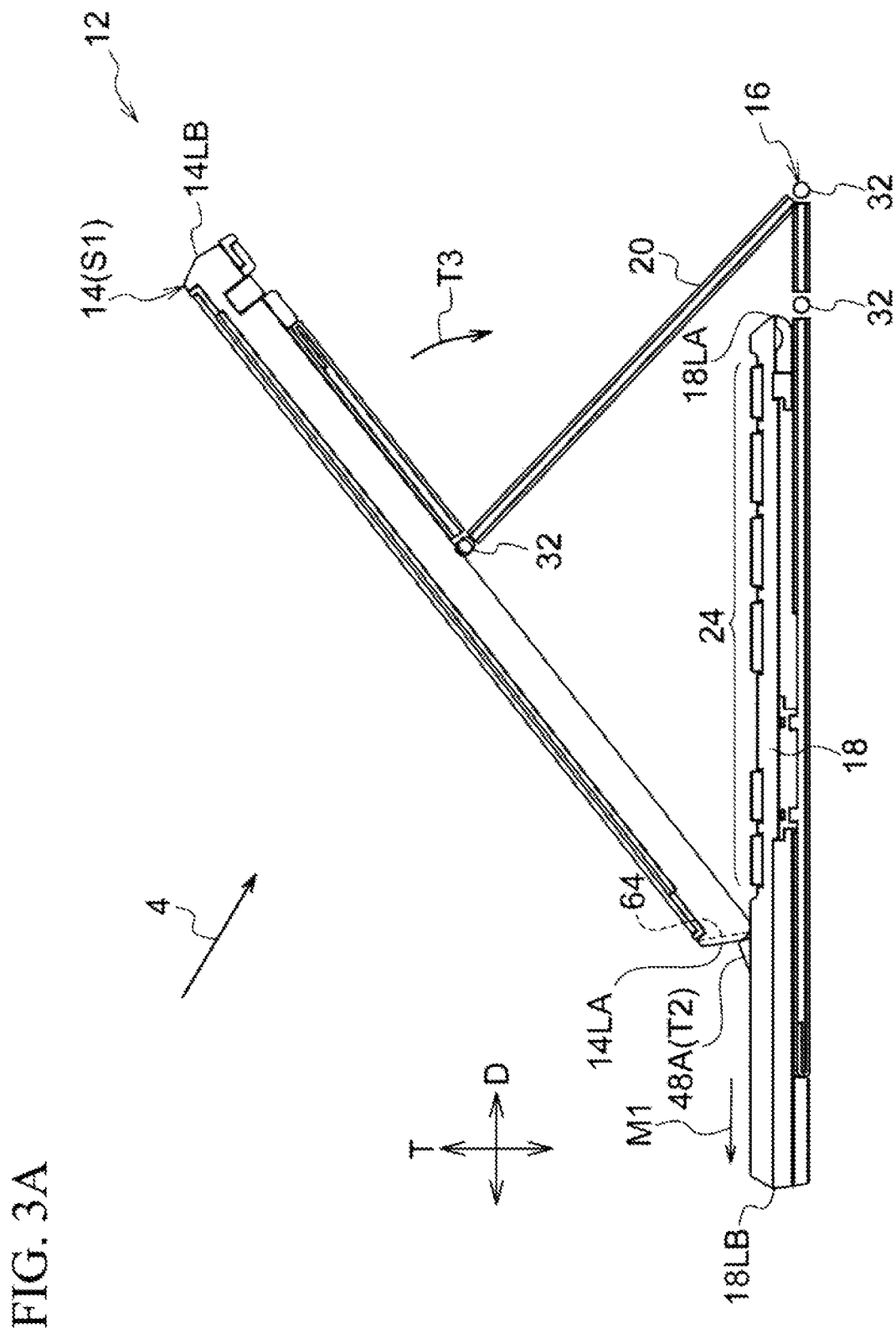
FIG. 3A is a side view showing the tablet computer and the keyboard dock as an example of the information processing apparatus of the first embodiment in a first standing state.
Figure 3B:
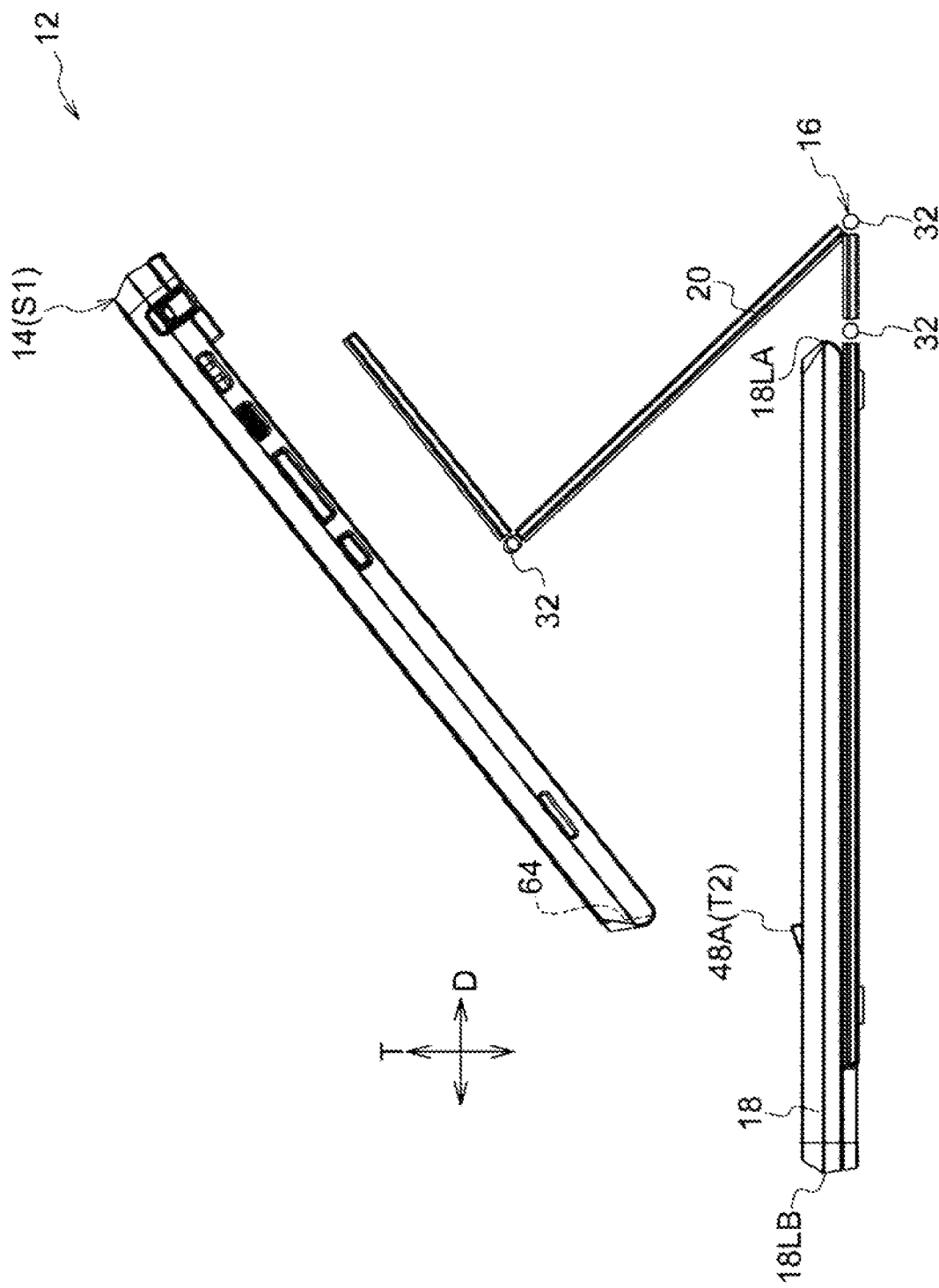
FIG. 3B is an exploded side view showing the tablet computer and the keyboard dock as an example of the information processing apparatus of the first embodiment in the first standing state.
Figure 4:
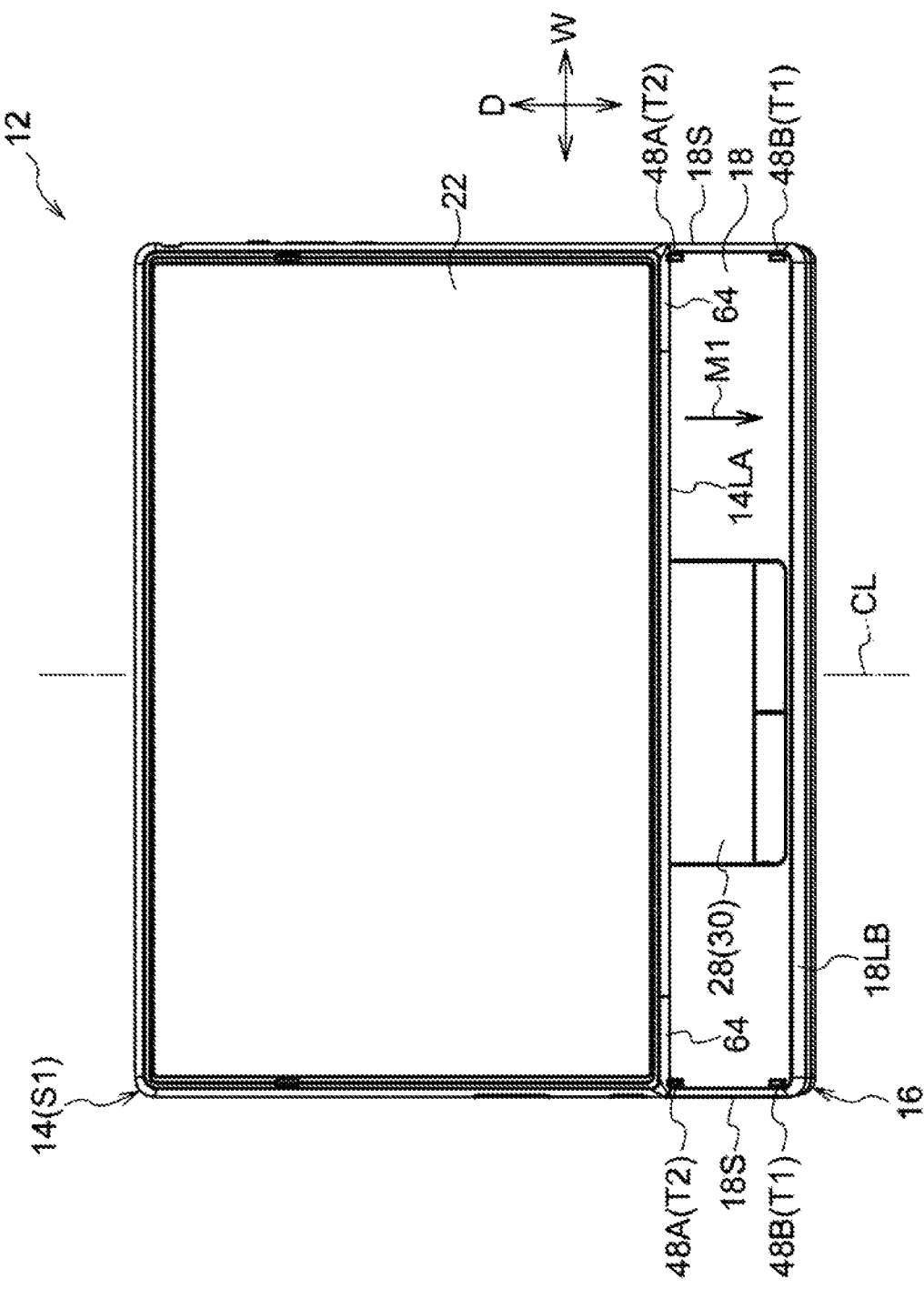
FIG. 4 is a view of the tablet computer and the keyboard dock as an example of the information processing apparatus of the first embodiment in the first standing state when viewed in a direction of arrow 4 in FIG. 3A.
Figure 5:
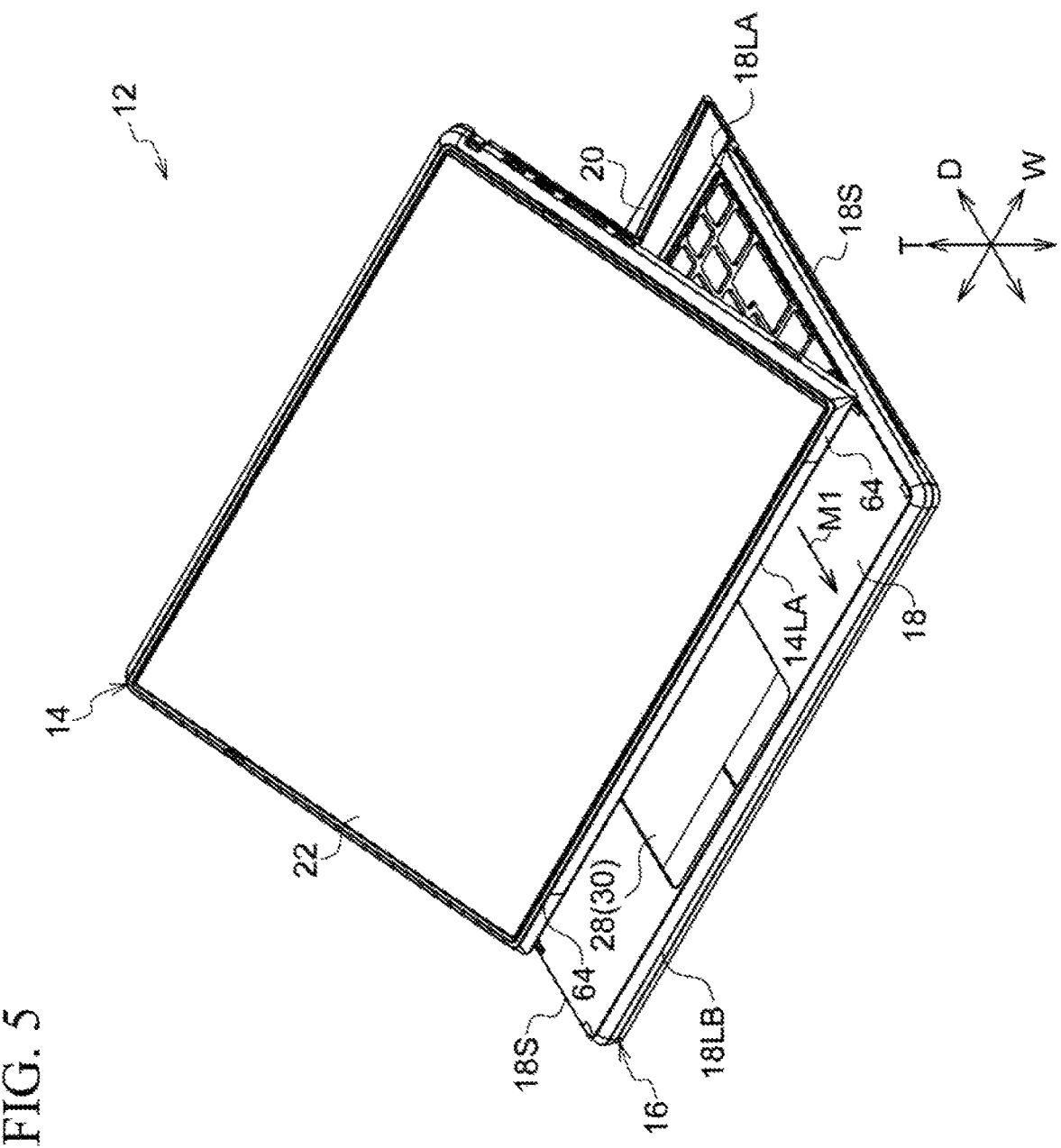
FIG. 5 is a perspective view showing the tablet computer and the keyboard dock as an example of the information processing apparatus of the first embodiment in the first standing state.
Figure 6A:
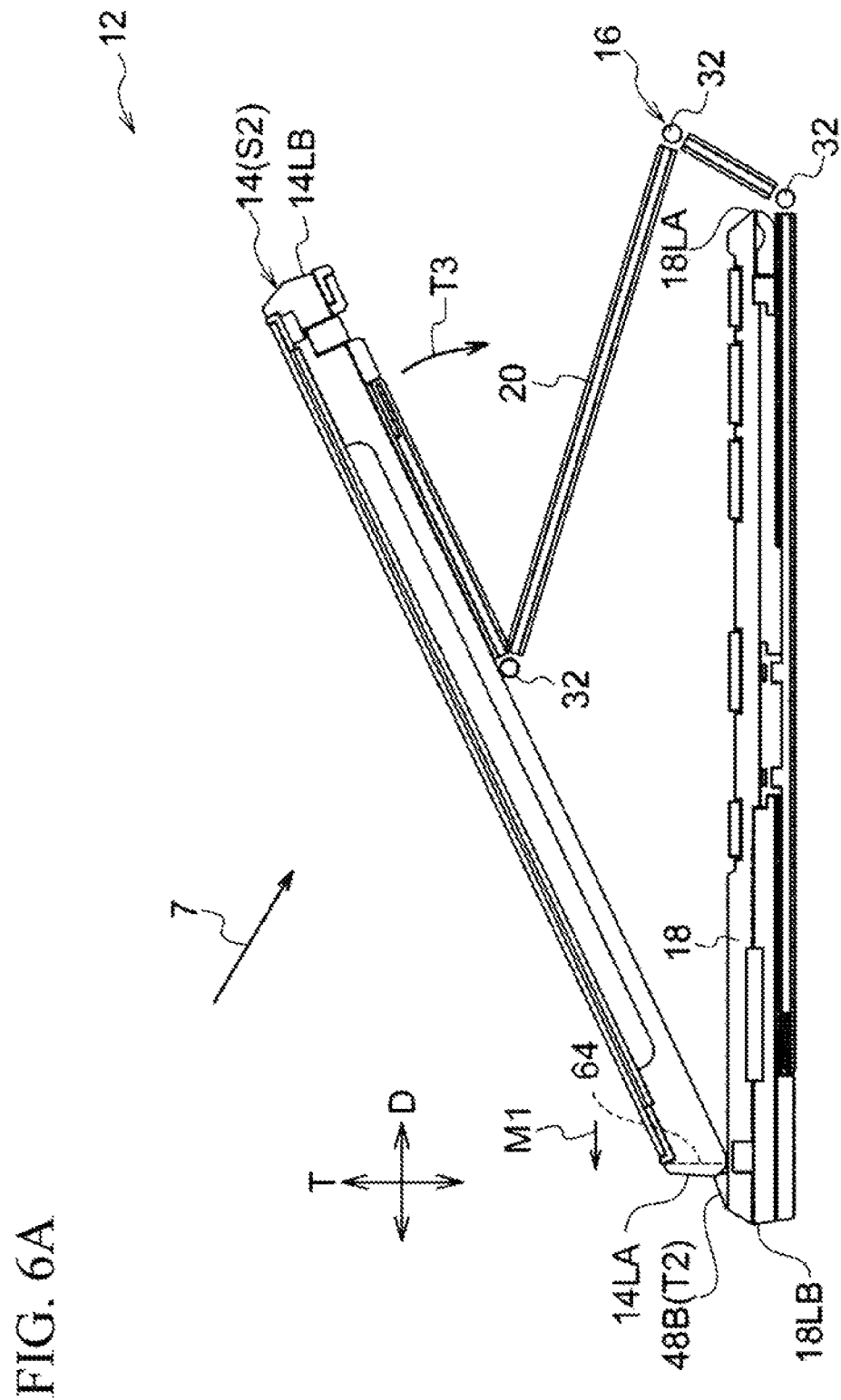
FIG. 6A is a side view showing the tablet computer and the keyboard dock as an example of the information processing apparatus of the first embodiment in a second standing state.
Figure 6B:
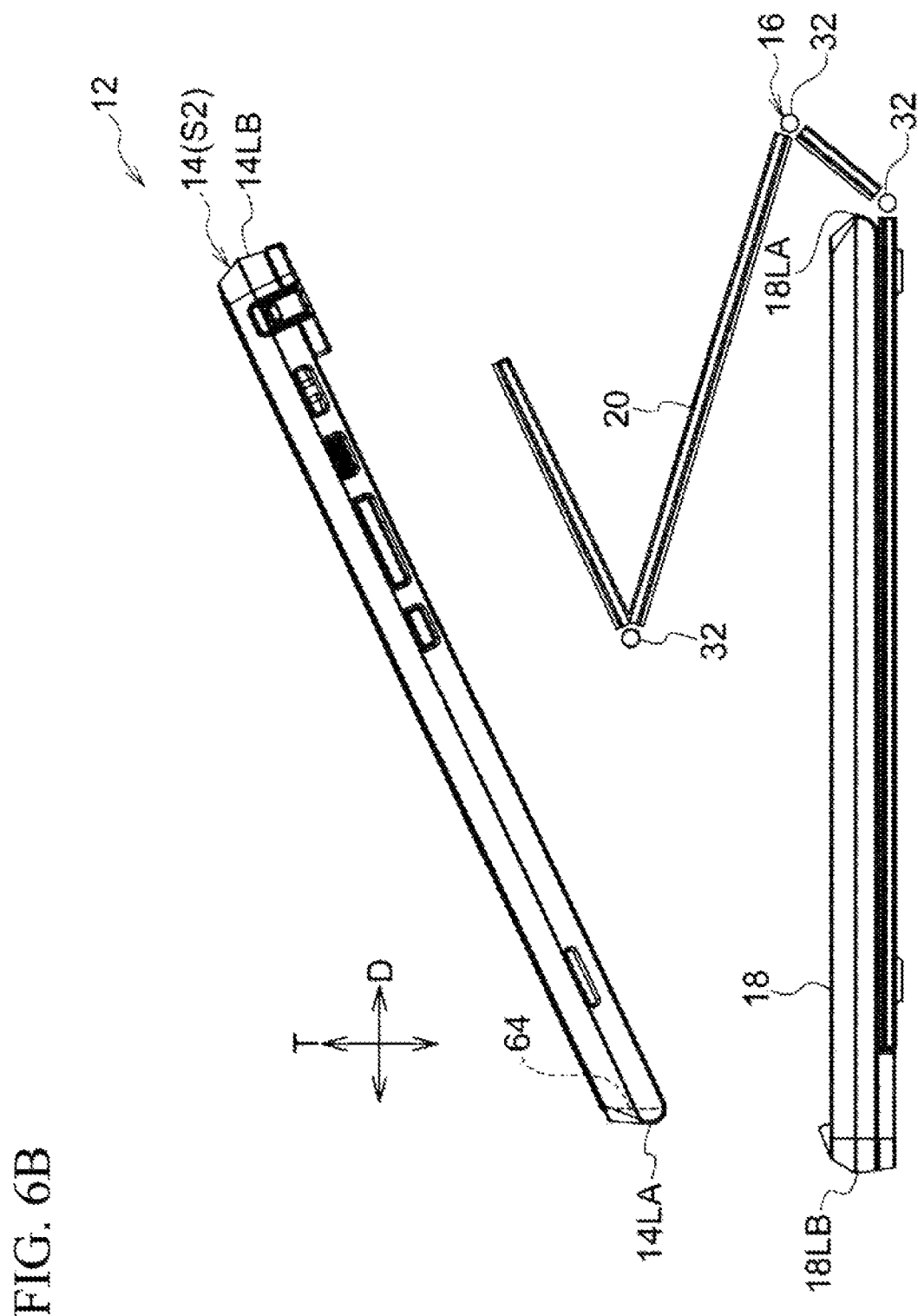
FIG. 6B is an exploded side view showing the tablet computer and the keyboard dock as an example of the information processing apparatus of the first embodiment in the second standing state.
Figure 7:
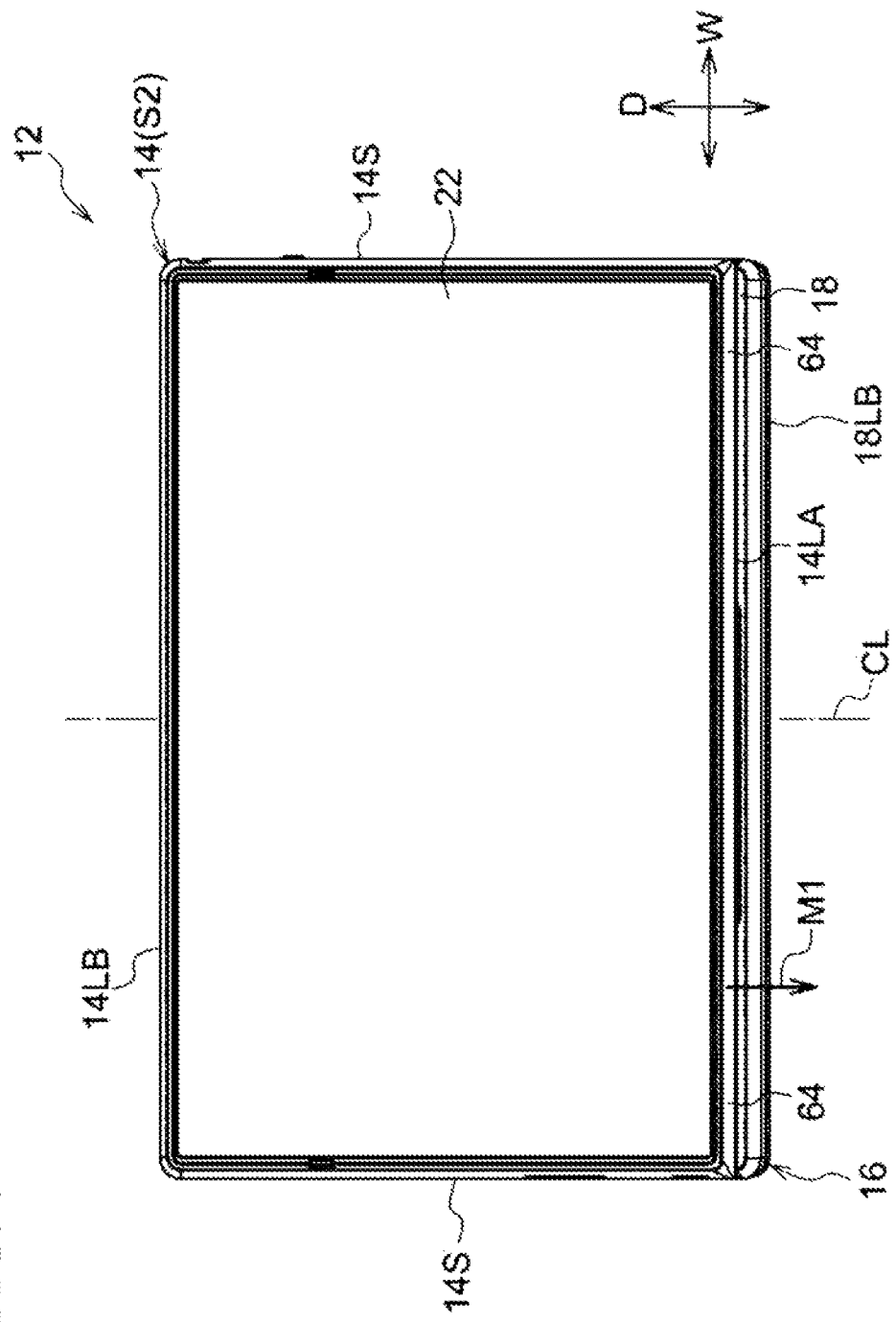
FIG. 7 is a view of the tablet computer and the keyboard dock as an example of the information processing apparatus of the first embodiment in the second standing state when viewed in a direction of arrow 7 in FIG. 6A.
Figure 8:
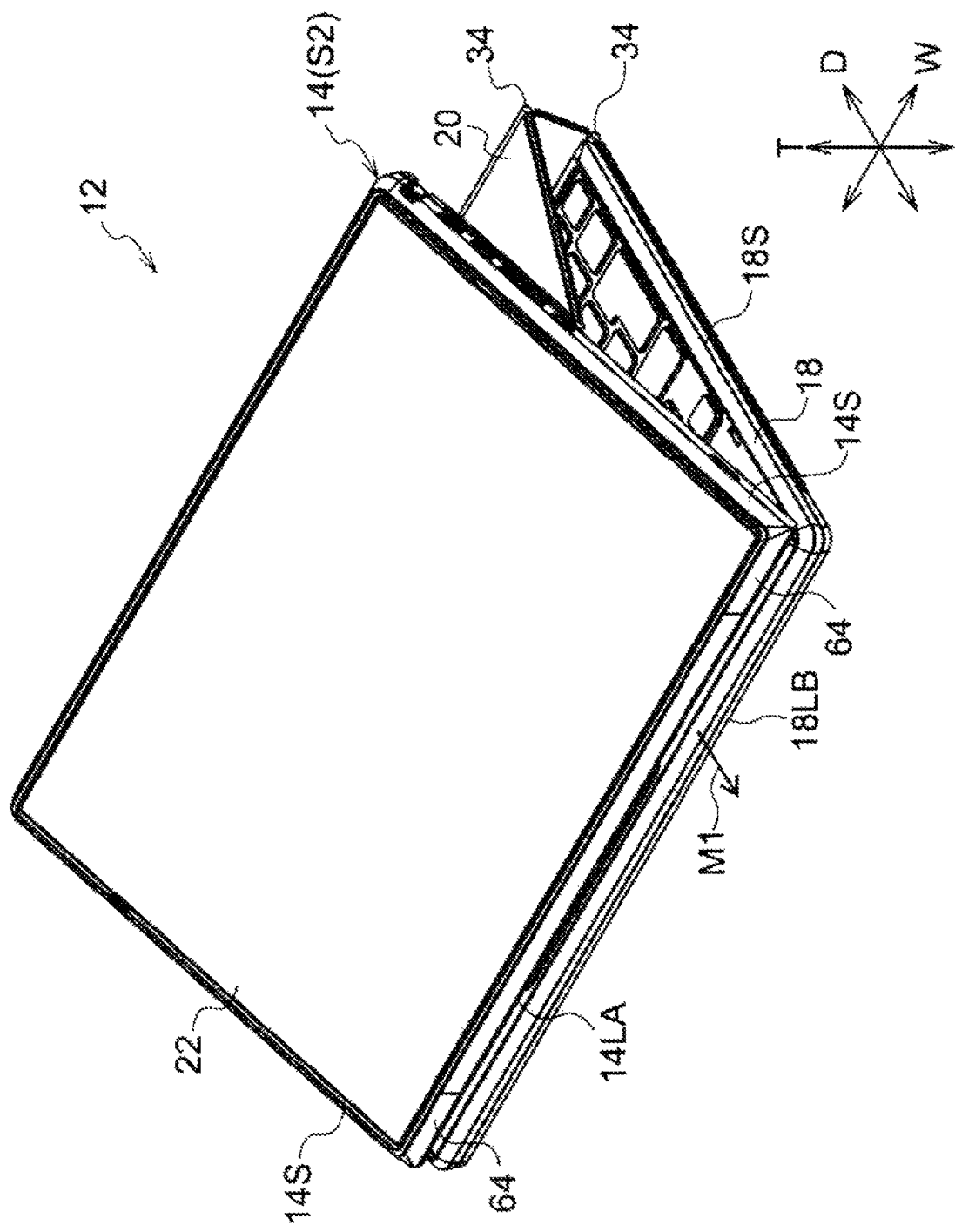
FIG. 8 is a perspective view showing the tablet computer and the keyboard dock as an example of the information processing apparatus of the first embodiment in the second standing state.

As shown in FIGS. 1, 3A and 6A, the tablet 14 can be attached to a tip end side of the connection plate 20 of the keyboard dock 16. That is, the keyboard 18 is mounted to the tablet 14 by the connection plate 20.

The connection plate 20 has a plurality of bending portions 32 that bend in a state in which the tablet 14 is attached in the above manner. By appropriately bending the connection plate 20 with the plurality of bending portions 32, it is possible to change the posture of the tablet 14 with respect to the keyboard 18. As a specific example, it is possible to change the posture of the tablet 14 into an open state P1 shown in FIG. 1, a first standing state S1 shown in FIG. 3A, a second standing state S2 shown in FIG. 6A, a closed state S3 shown in FIG. 9, and a slate state P2 shown in FIG. 10. In the first standing state S1 and the second standing state S2, part of the load of the tablet 14 acts on the connection plate 20. The connection plate 20 has such a rigidity that it is not bent at the bending portions 32 by the load, that is, the tablet 14 does not fall in the direction of an arrow T3 due to the load.

Structures for attaching the connection plate 20 to the keyboard 18 are not particularly limited. For example, fastening with a screw, hooking with a hook, suction holding with a magnet, or the like may be adopted. Similarly, structures for connecting the keyboard dock 16 (the connection plate 20) to the tablet 14 are not particularly limited, and fastening with a screw, hooking with a hook, suction holding with a magnet, or the like may be adopted.

As shown in FIGS. 11 to 19, a plurality of projecting members 42 are attached to the keyboard 18.

Figure 2:
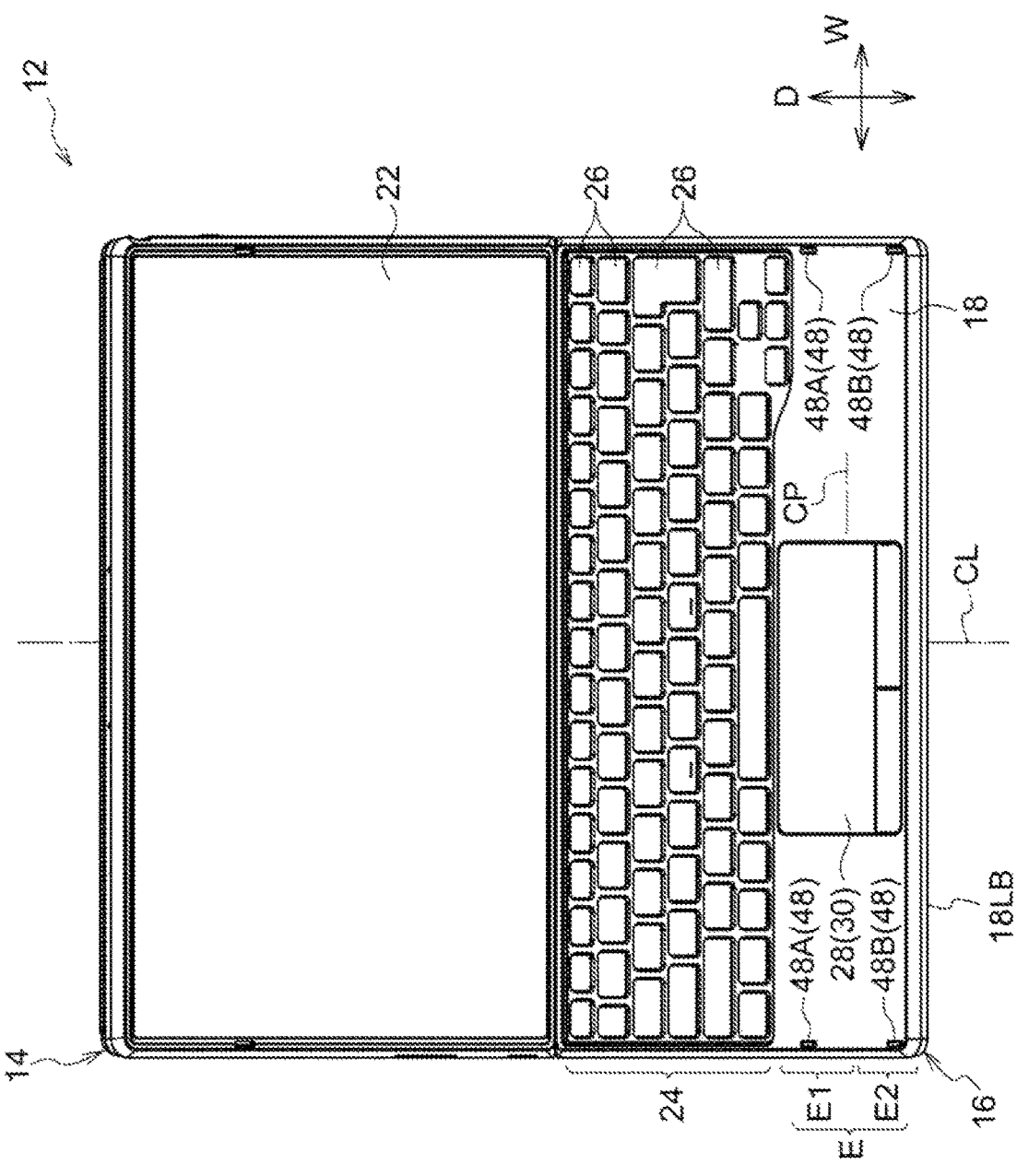
FIG. 2 is a view of the tablet computer and the keyboard dock as an example of the information processing apparatus of the first embodiment in the open state when viewed in a direction of arrow 2 in FIG. 1.

As shown in FIG. 2, the present embodiment includes a pair of left and right projecting members 42A disposed in a region E1 close to the key arrangement portion 24 within a region E between the key arrangement portion 24 and the second long side 18LB, and a pair of left and right projecting members 42B disposed in a region E2 close to the second long side 18LB within the region E. The position of the region E1 is closer to the key arrangement portion 24 than an intermediate position CP between the key arrangement portion 24 and the second long side 18LB is. The position of the region E2 is closer to the second long side 18LB than the intermediate position CP is.

The two projecting members 42A are arranged spaced apart in the width direction (the direction of an arrow W) and have a left-right symmetrical shape and arrangement with the center line CL of the keyboard 18 as an axis of symmetry. Similarly, the two projecting members 42B are also arranged spaced apart in the width direction (the direction of the arrow W) and have a left-right symmetrical shape and arrangement with the center line CL of the keyboard 18 as an axis of symmetry. Hereinafter, structures will be described with reference to the projecting member 42A disposed on the right side in the width direction among the plurality of projecting members 42 as an example.

Figure 12:
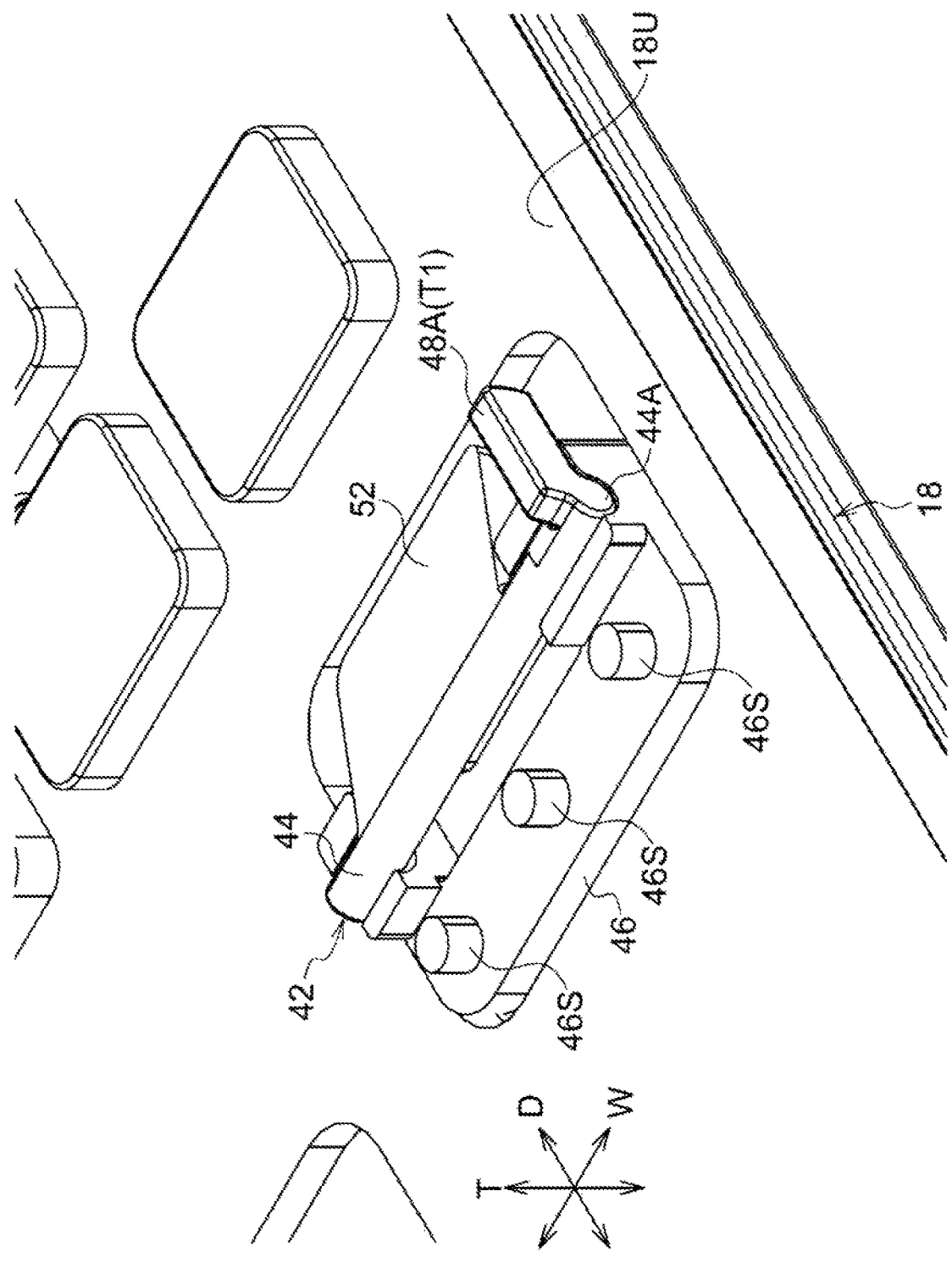
FIG. 12 is an enlarged perspective view of the inside of the keyboard showing the vicinity of the stopper which is at the accommodation position in the information processing apparatus of the first embodiment.
Figure 13:
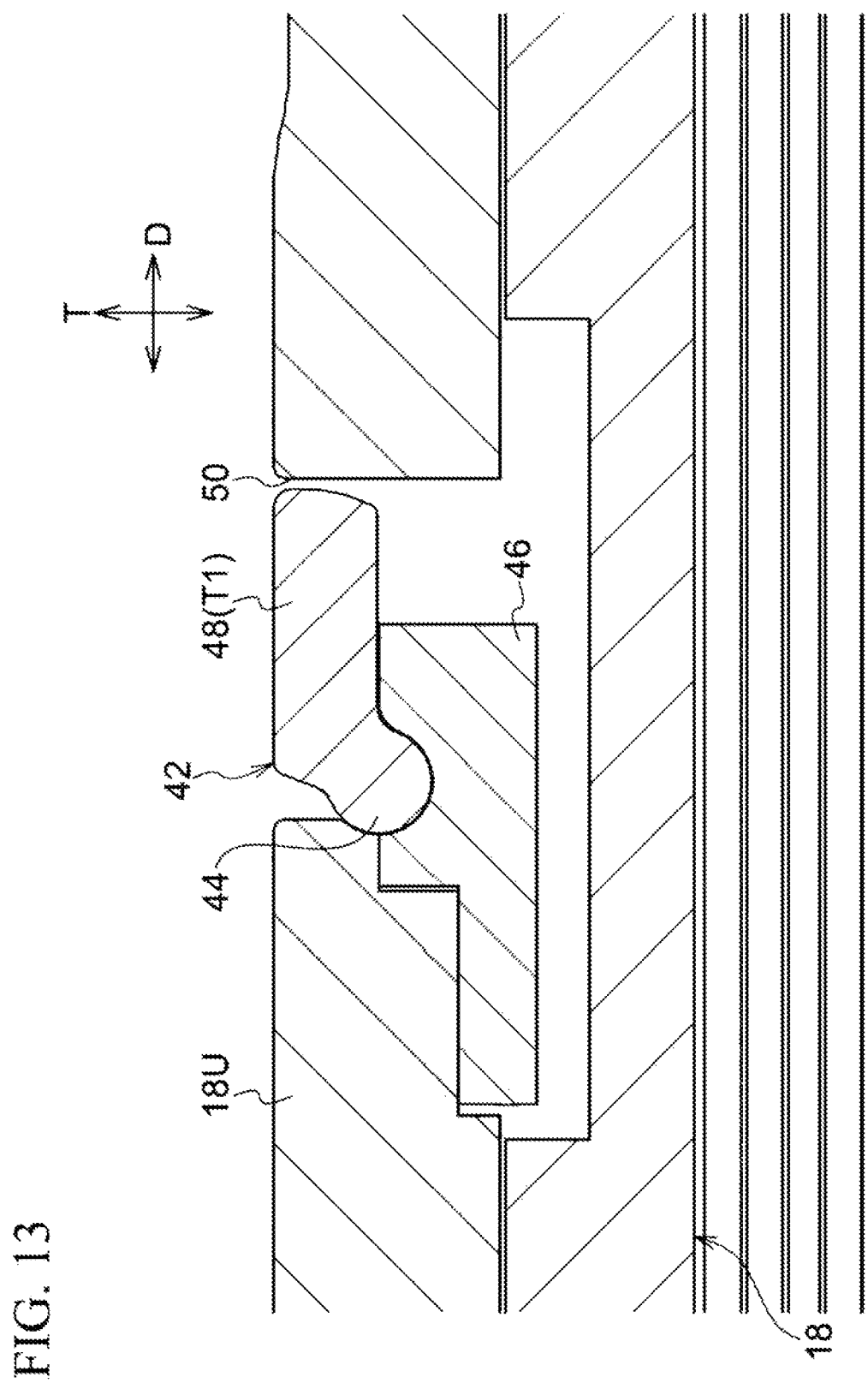
FIG. 13 is a cross-sectional view taken along line 13-13 in FIG. 11 with the stopper being at the accommodation position in the information processing apparatus of the first embodiment.
Figure 14:
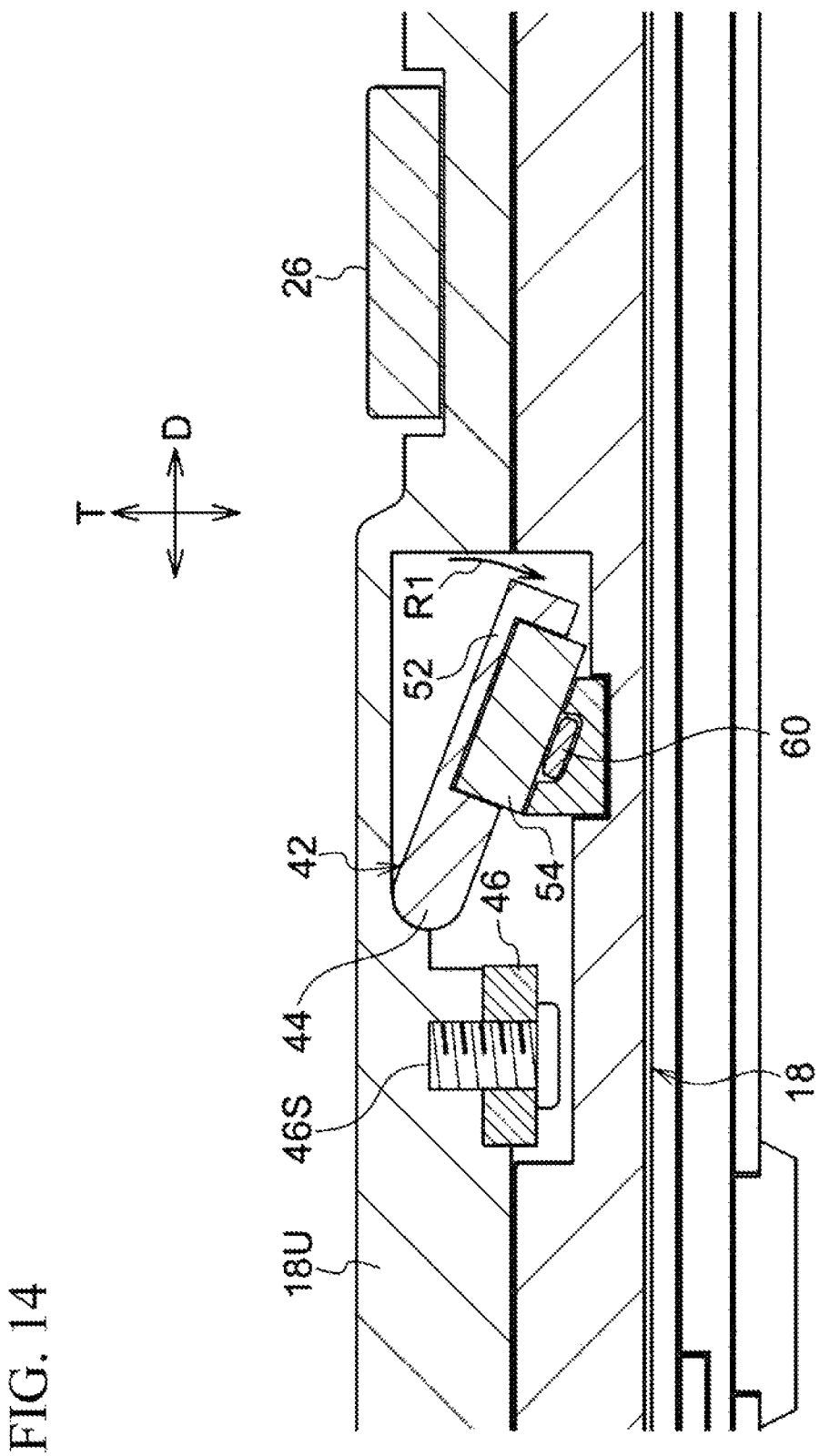
FIG. 14 is a cross-sectional view taken along line 14-14 in FIG. 11 with the stopper being at the accommodation position in the information processing apparatus of the first embodiment.
Figure 15:
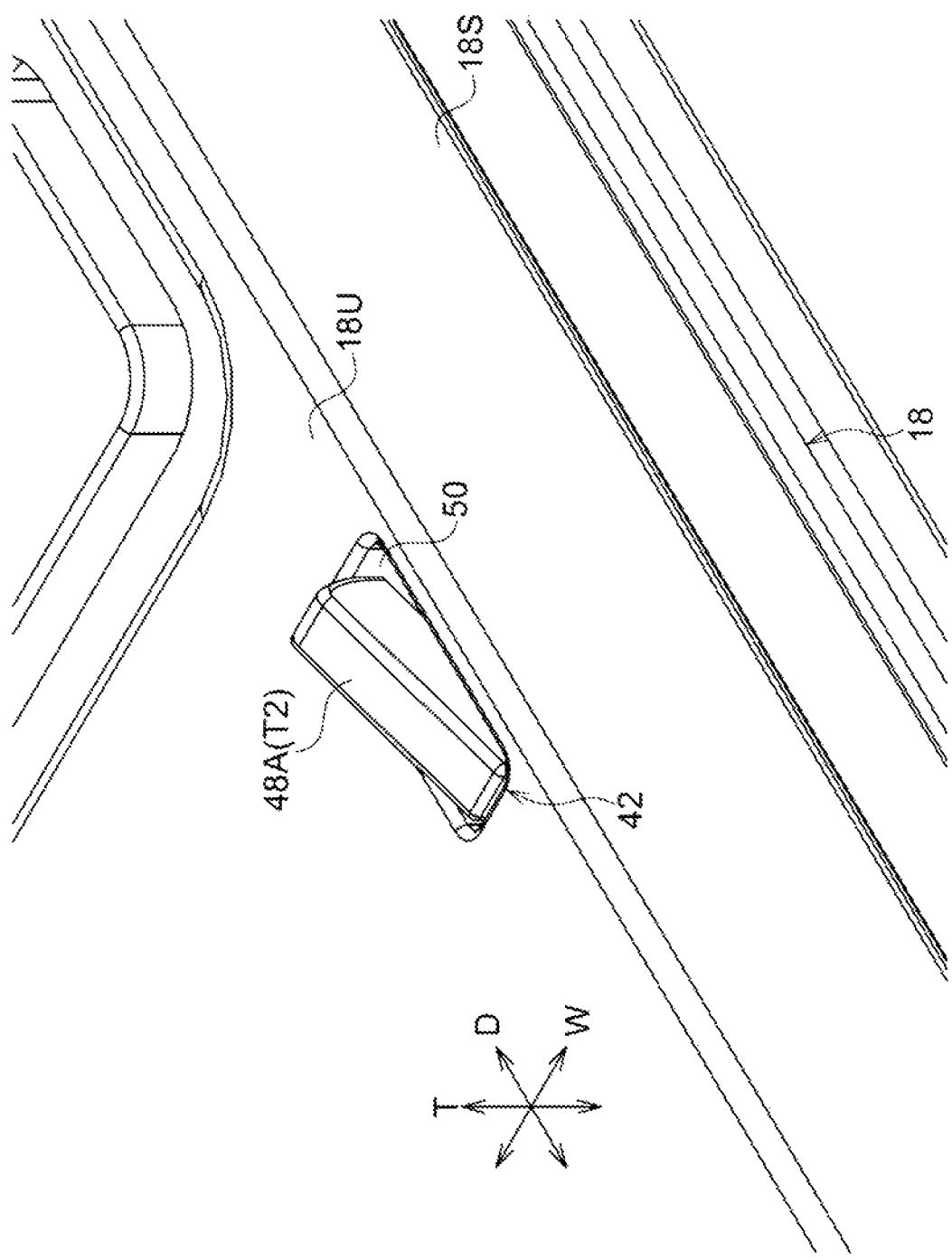
FIG. 15 is an enlarged perspective view showing the vicinity of the stopper which is at a projecting position in the information processing apparatus of the first embodiment.
Figure 16:
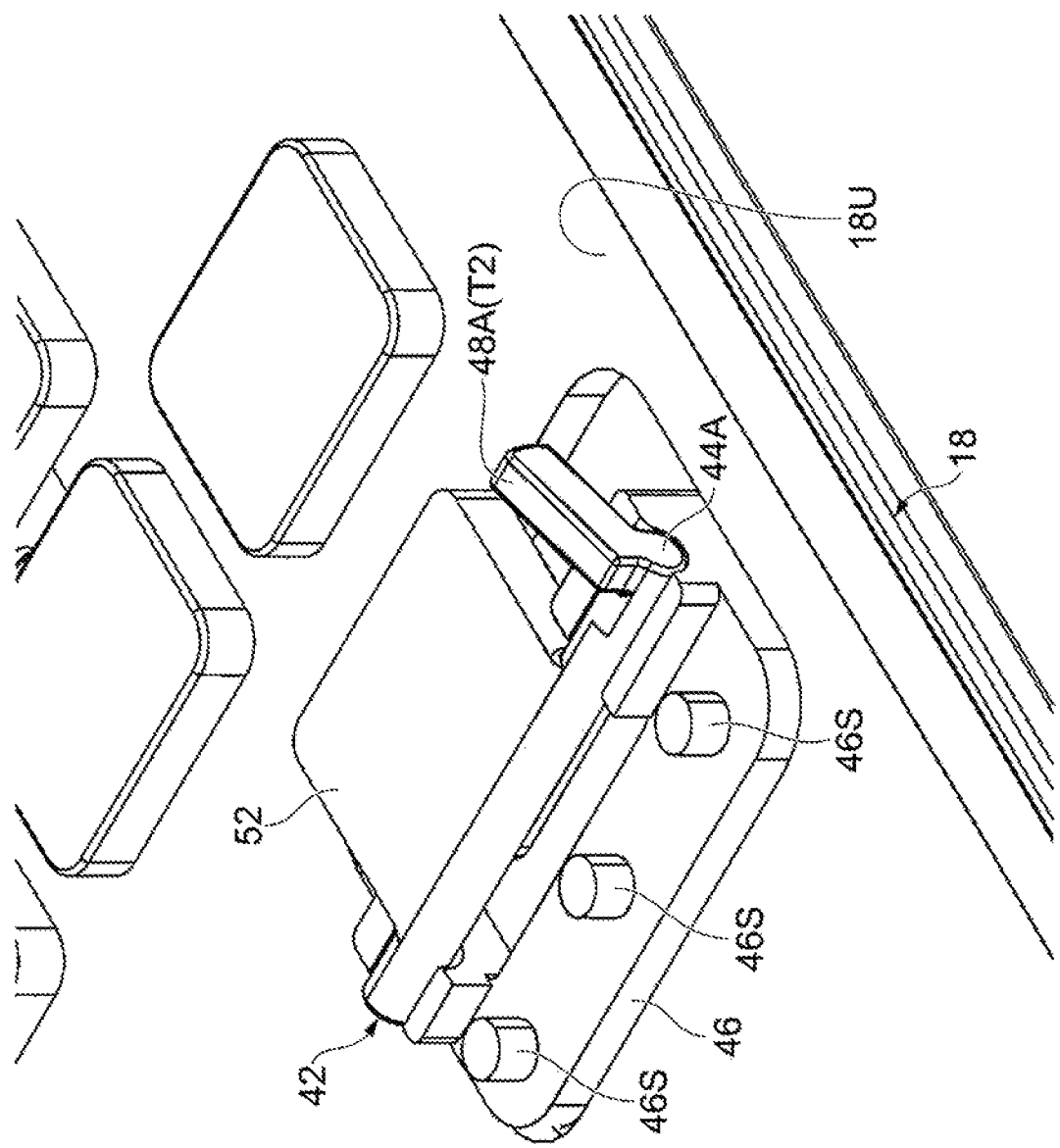
FIG. 16 is an enlarged perspective view of the inside of the keyboard showing the vicinity of the stopper which is at the projecting position in the information processing apparatus of the first embodiment.
Figure 17:
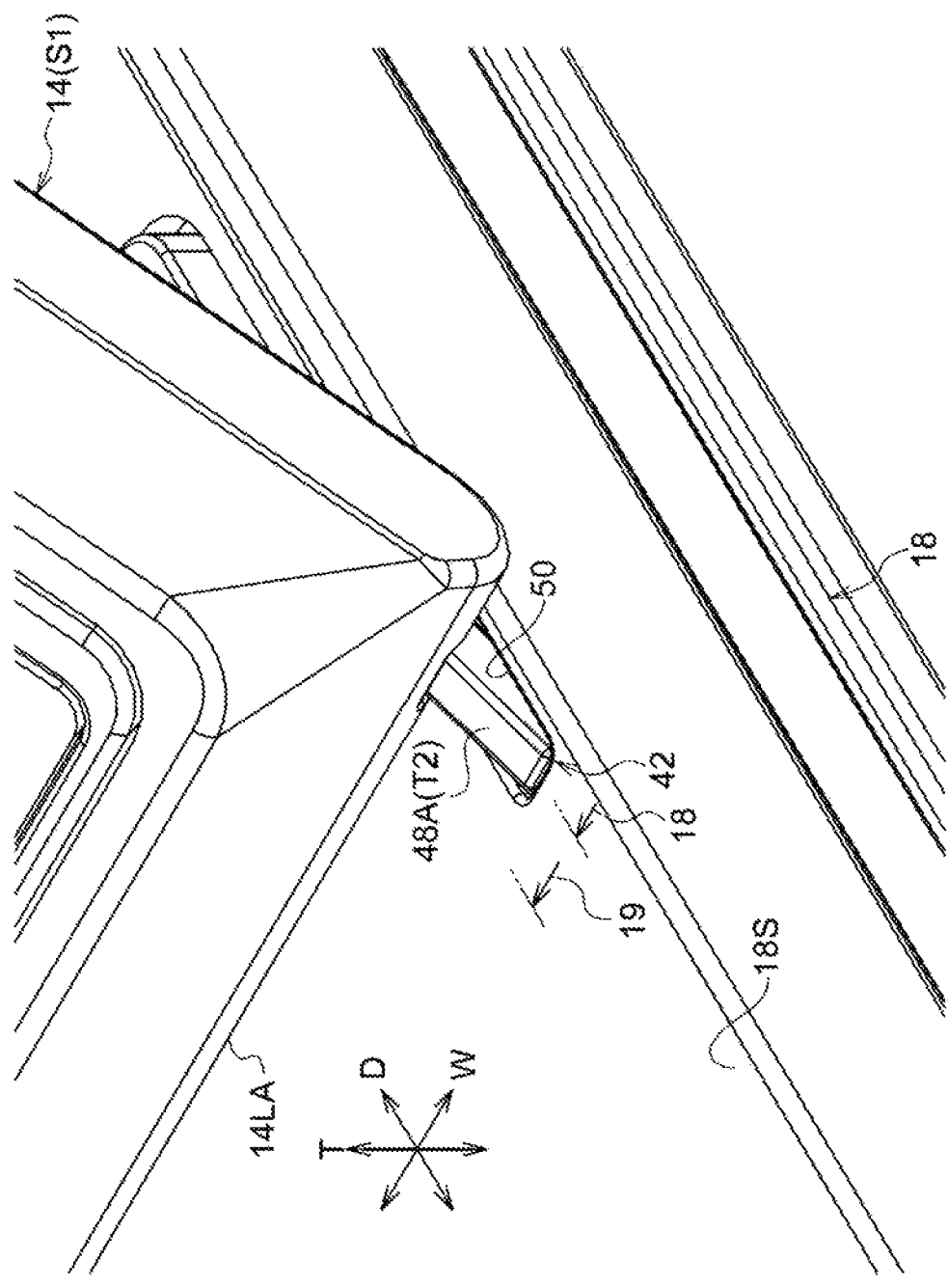
FIG. 17 is an enlarged perspective view showing the vicinity of the stopper which is at the projecting position in the information processing apparatus of the first embodiment, together with part of the tablet.
Figure 20:
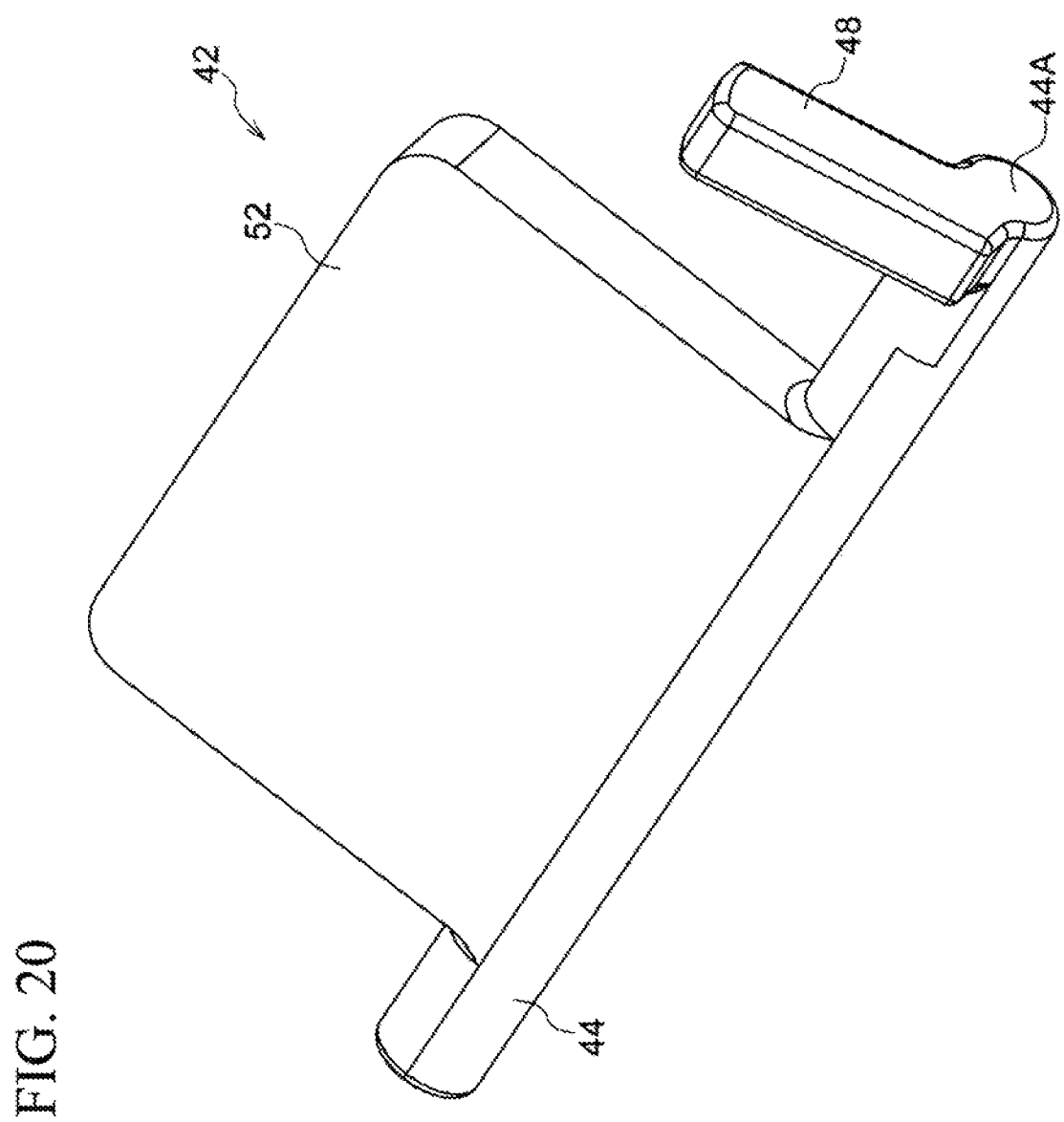
FIG. 20 is a perspective view showing a projecting member of the information processing apparatus of the first embodiment.
Figure 21:
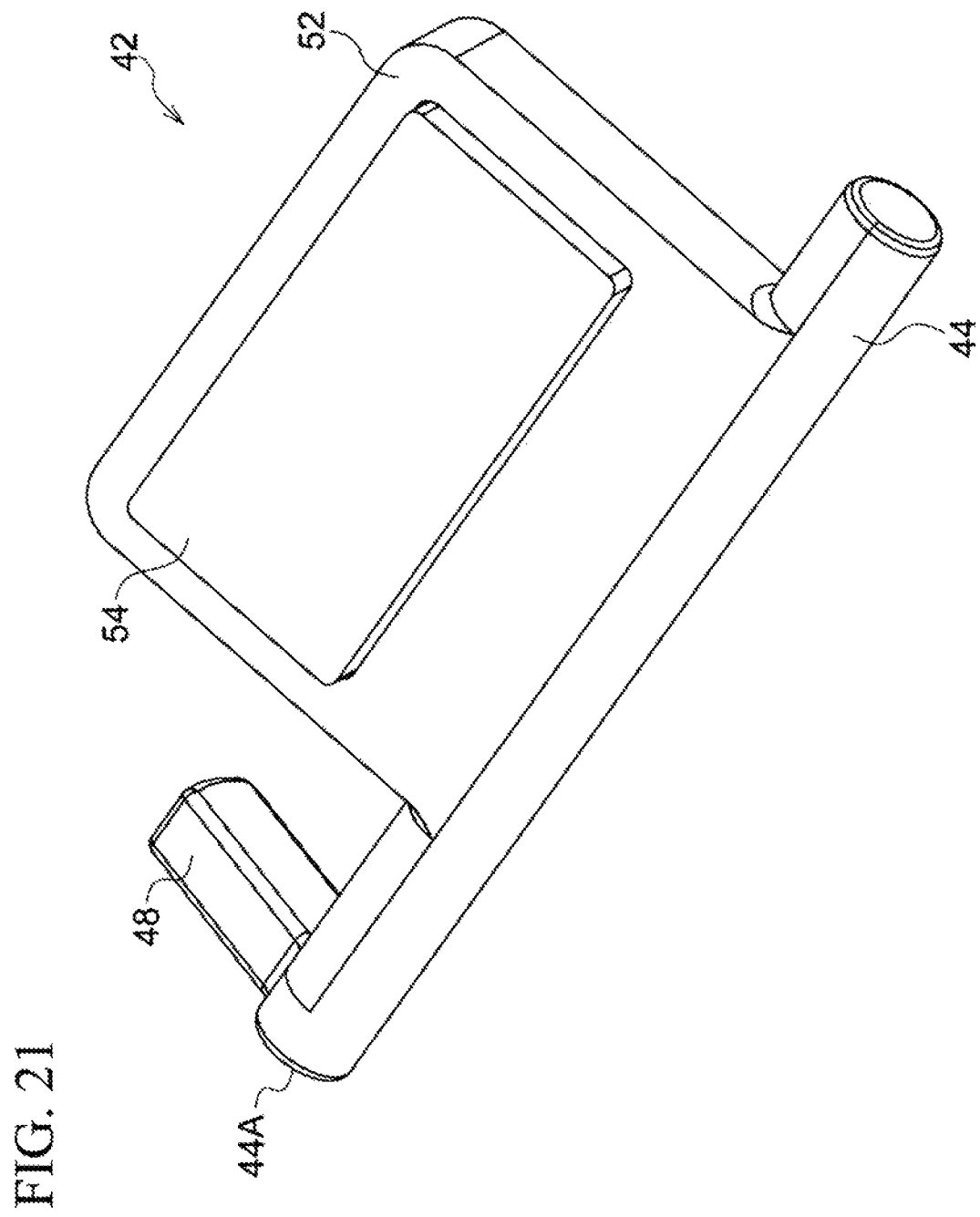
FIG. 21 is a perspective view showing the projecting member of the information processing apparatus of the first embodiment when inverted.

As also shown in detail in FIGS. 20 and 21, each of the projecting members 42 has a rotary shaft 44. As shown in FIGS. 12 to 14, in the keyboard 18, a fixing component 46 is fixed to an upper plate 18U of the keyboard 18 by a screw 46S or the like. The rotary shaft 44 is rotatably held by the fixing component 46. The axial direction of the rotary shaft 44 coincides with the width direction of the keyboard 18 (the direction of the arrow W).

A stopper 48 projects from one end 44A in the axial direction of the rotary shaft 44. The end 44A in the axial direction of the rotary shaft 44 mentioned here is an end portion thereof located outside in the width direction of the keyboard 18.

The stopper 48 projects outward in the radial direction of the rotary shaft 44. A through hole 50 which goes completely through the upper plate 18U of the keyboard 18 is formed in the upper plate 18U at a position corresponding to the stopper 48. Then, in accordance with the rotation angle of the rotary shaft 44, the stopper 48 moves between an accommodation position T1 shown in FIGS. 11 to 13 and a projecting position T2 shown in FIGS. 15 to 18. At the accommodation position T1, the stopper 48 does not project from the upper plate 18U of the keyboard 18 and is accommodated in the keyboard 18. At the projecting position T2, a tip end side of the stopper 48 projects from the upper plate 18U of the keyboard 18.

A holding plate 52 projects from the rotary shaft 44. The holding plate 52 is located on the side inward in the width direction from the stopper 48.

A magnet 54 is held by the holding plate 52. In the keyboard 18, a magnetic member 60 smaller than magnetic members 56 and 58 which will be described later is attached at a position facing the magnet 54. The rotary shaft 44 receives a rotational force in a direction in which the stopper 48 moves to the accommodation position T1 (in the direction of the arrow R1) due to a magnetic force (attractive force F1) acting on the magnetic member 60 and the magnet 54. That is, the stopper 48 is at the accommodation position T1 when the tablet 14 is in a state other than the first standing state S1, the second standing state S2 and the closed state S3 which will be described later.

Figure 19:
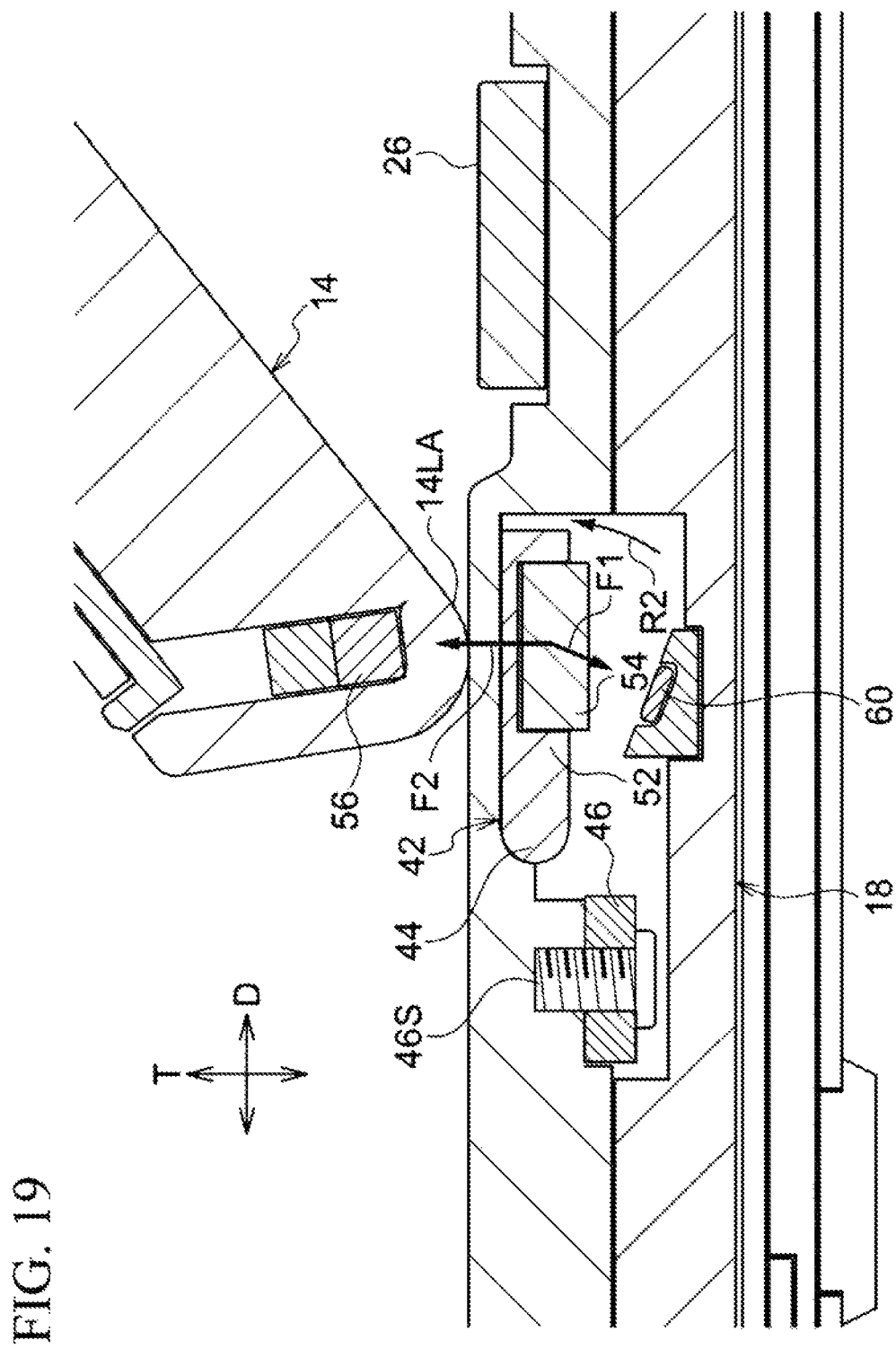
FIG. 19 is a cross-sectional view taken along line 19-19 in FIG. 17 with the stopper at the projecting position in the information processing apparatus of the first embodiment.

As shown in FIG. 19, in the tablet 14, the magnetic member 56 which is formed of a magnetic body is disposed in the vicinity of the first long side 14LA which is one of the long sides. In the first standing state S1 shown in FIG. 3A and the second standing state S2 shown in FIG. 6A, the magnetic member 56 approaches the magnet 54 and a magnetic force (attractive force F2) acts between the magnet 54 and the magnetic member 56. The attractive force F2 acting between the magnet 54 and the magnetic member 56 is greater than the attractive force F1 acting on the magnetic member 60 and the magnet 54. Thereby, the rotary shaft 44 rotates in the direction of the arrow R2 and the stopper 48 moves from the accommodation position T1 to the projecting position T2.

Figure 18:
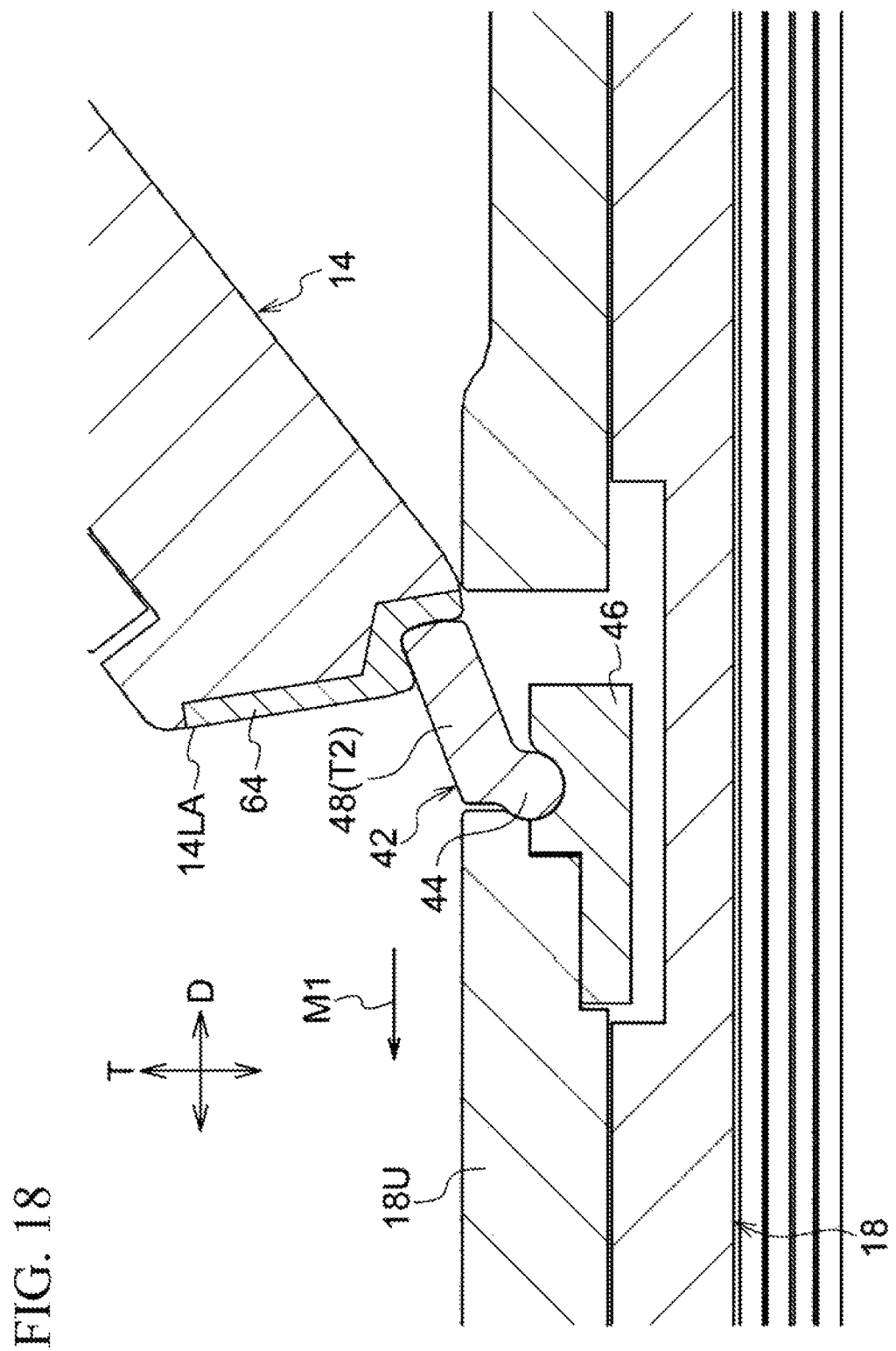
FIG. 18 is a cross-sectional view taken along line 18-18 in FIG. 17 with the stopper being at the projecting position in the information processing apparatus of the first embodiment.

As shown in FIG. 18, the stopper 48 which is at the projecting position T2 is in contact with the first long side 14LA of the tablet 14 in the first standing state S1 and the second standing state S2. That is, even if the tablet 14 were to slide on the keyboard 18 and move toward the second long side 18LB (in the direction of the arrow M1), the stopper 48 holds the tablet 14 to prevent this movement.

Figure 22:
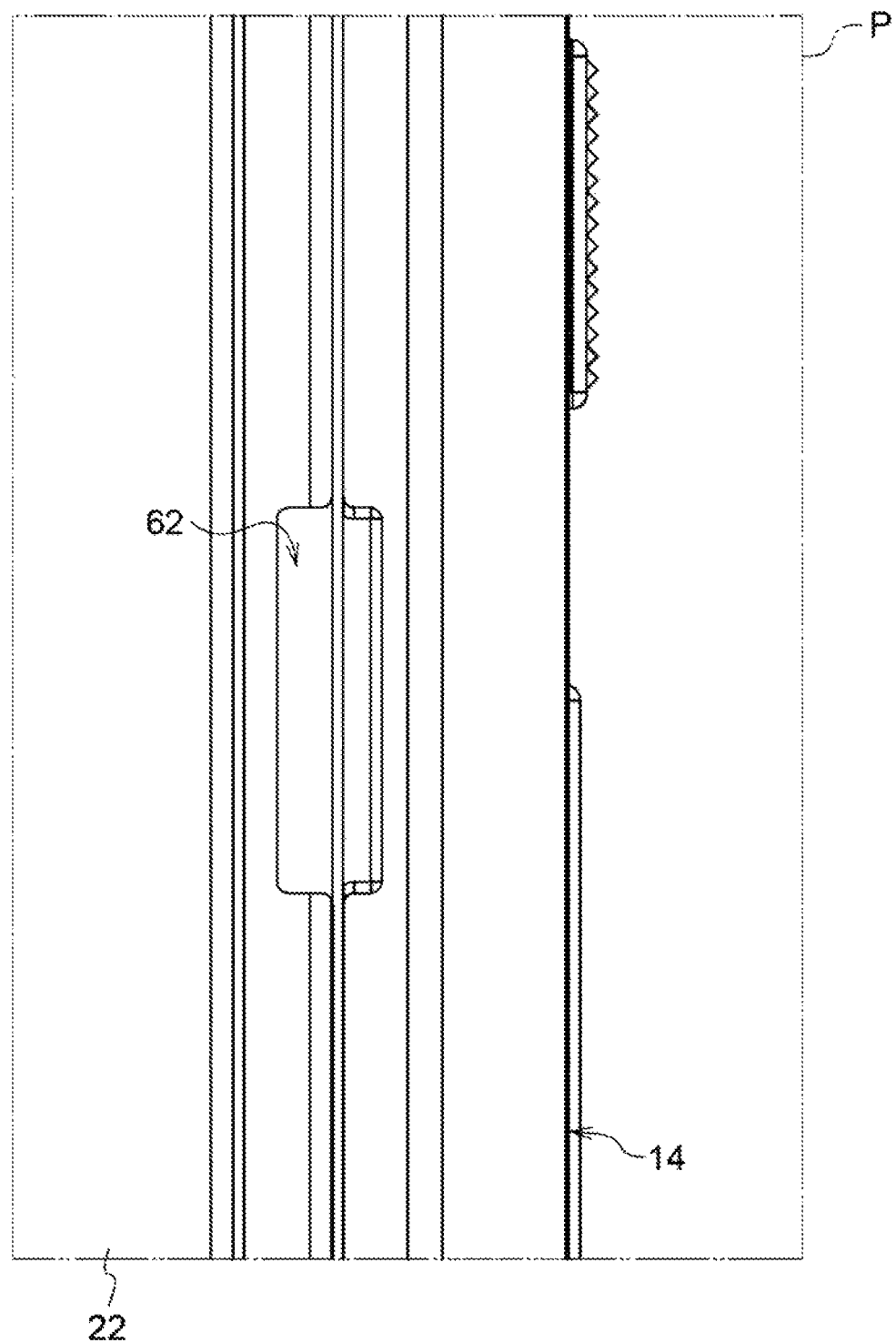
FIG. 22 is an enlarged plan view of FIG. 10 showing the tablet computer and the keyboard dock as an example of the information processing apparatus of the first embodiment.
Figure 23:
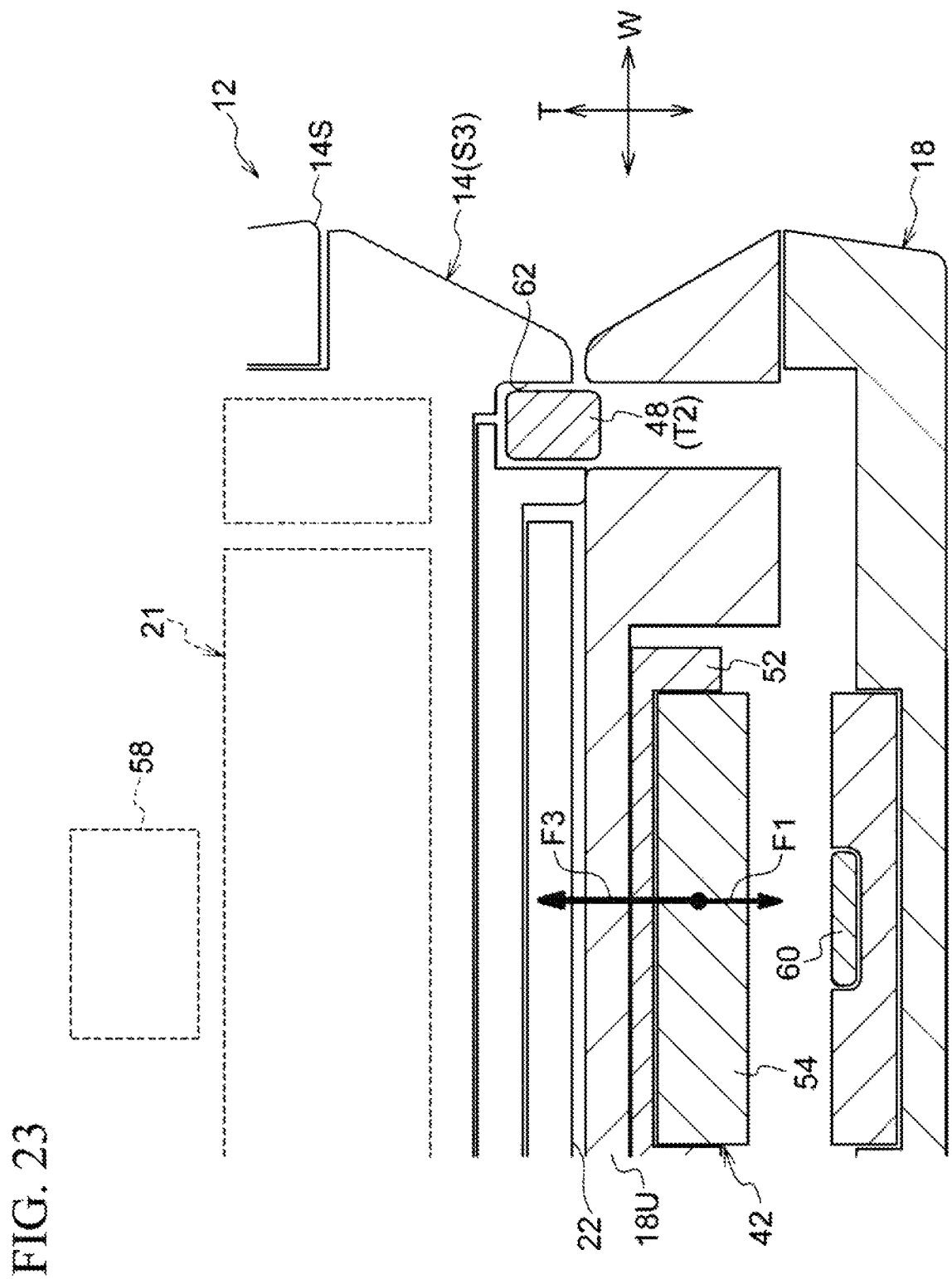
FIG. 23 is a cross-sectional view taken along line 23-23 of FIG. 9 showing the tablet computer and the keyboard dock as an example of the information processing apparatus of the first embodiment in a closed state.

As shown in FIGS. 9 and 22, a pair of left and right recesses 62 are formed in the tablet 14 at intervals in the width direction. As shown in FIG. 23, the recesses 62 are formed at positions corresponding to the stoppers 48 in the closed state S3 of the tablet 14.

In the tablet 14, the magnetic member 58 formed of a magnetic body is disposed on the side inward in the width direction from the recess 62. In the closed state S3 shown in FIG. 23, the magnetic member 58 approaches the magnet 54 and a magnetic force (attractive force F3) acts between the magnet 54 and the magnetic member 58. The attractive force F3 acting between the magnet 54 and the magnetic member 58 is greater than the attractive force F1 acting on the magnetic member 60 and the magnet 54. Thereby, the rotary shaft 44 rotates in the direction of the arrow R2 (see FIG. 19) and the stopper 48 moves from the accommodation position T1 to the projecting position T2.

As shown in FIG. 23, the stopper which is at the projecting position T2 is accommodated in and engages with the recess 62 of the tablet 14 in the closed state S3. That is, even if the tablet 14 were to slide on the keyboard 18 and move in the depth direction (the direction of the arrow D) or the width direction of the keyboard 18 (the direction of the arrow W), the stopper 48 engages with the recess 62 to prevent the movement. In particular, since a plurality of (two in the present embodiment) stoppers 48 are provided, it is possible to prevent in-plane rotation of the tablet 14 with respect to the keyboard 18. The in-plane rotation is rotation in a direction along a surface of the keyboard 18 on which the key arrangement portion 24 is provided.

As shown in FIGS. 4, 5, 7 and 8, a pair of left and right speakers 64 are provided on the first long side 14LA of the tablet 14. In the first standing state S1 shown in FIGS. 4 and 5 and the second standing state shown in FIGS. 7 and 8, the speakers 64 are disposed at positions at which they are exposed and not covered by the keyboard 18.

The speakers 64 are positioned on a lower or upper side when the tablet 14 is gripped at the short sides 14S. That is, the speakers 64 are disposed at positions not covered by a hand or the like holding the tablet 14.

Next, the operation of the present embodiment will be described.

In the information processing apparatus 12 of the present embodiment, it is possible to hold the tablet 14 with respect to the keyboard 18 in the first standing state S1 shown in FIGS. 3A to 5 and the second standing state S2 shown in FIGS. 6A-8. In any of the first standing state S1 and the second standing state S2, the tablet 14 is inclined with respect to the keyboard 18 such that the display screen 22 faces obliquely upward, and thus the display screen 22 is easily viewed.

In the first standing state S1, the touchpad 28 is not covered by the tablet 14. Therefore, it is possible to operate the touchpad 28 to input data to the tablet 14. It is also possible to view display content on the touchpad 28 when the touchpad 28 is used as the second display screen.

Further, in the first standing state S1, the stopper 48A projecting from the upper plate 18U of the keyboard 18 is in contact with the first long side 14LA of the tablet 14 to hold the tablet 14. Thus, movement of the tablet 14 in the direction of the arrow M1 is prevented.

On the other hand, in the second standing state S2, the tablet 14 is held at a position closer to the second long side 18LB of the keyboard 18 than in the first standing state S1.

In the second standing state S2, the stopper 48B projecting from the upper plate 18U of the keyboard 18 is in contact with the first long side 14LA of the tablet 14 to hold the tablet 14. Thus, movement of the tablet 14 in the direction of the arrow M1 is prevented.

In the first standing state S1, the speakers 64 of the tablet 14 are not covered by the keyboard 18. Similarly, in the second standing state S2, the speakers 64 of the tablet 14 are not covered by the keyboard 18. Therefore, in both the first standing state S1 and the second standing state S2, the sound quality is high compared to structures in which the speakers 64 are covered by the keyboard 18.

Further, in the information processing apparatus 12 of the present embodiment, it is possible to put the keyboard 18 and the tablet 14 in an overlapping state as shown in FIG. 9, that is, in the closed state S3. In the closed state, the outer shape of the keyboard 18 matches the outer shape of the tablet 14. Thus, the information processing apparatus 12 is compact and easy to carry compared to structures in which the keyboard 18 and the tablet 14 are displaced from each other in the closed state.

In the closed state S3, the stopper 48 projecting from the upper plate 18U of the keyboard 18 is accommodated in and engages with the recess of the tablet 14 as shown in FIG. 23. Thus, movement of the tablet 14 in in-plane directions of the keyboard 18, that is, in both the depth direction (the direction of the arrow D) and the width direction (the direction of the arrow W), is prevented.

In particular, in the present embodiment, it is possible to prevent in-plane rotation of the tablet 14 with respect to the keyboard 18 since a plurality of (two) stoppers 48 are provided.

As described above, by preventing in-plane rotation of the tablet 14 in the closed state of the tablet 14 with respect to the keyboard 18, the keyboard 18 and the tablet 14 are not displaced inadvertently and therefore the information processing apparatus 12 is excellent in terms of convenience.

Next, a second embodiment will be described. In the second embodiment, elements, members, and the like the same as those in the first embodiment are denoted by the same reference signs as in the first embodiment and detailed descriptions thereof will be omitted. Further, the information processing apparatus of the second embodiment can adopt the same overall structure as that of the information processing apparatus of the first embodiment and thus the illustration of the overall structure is omitted.

Figure 24:
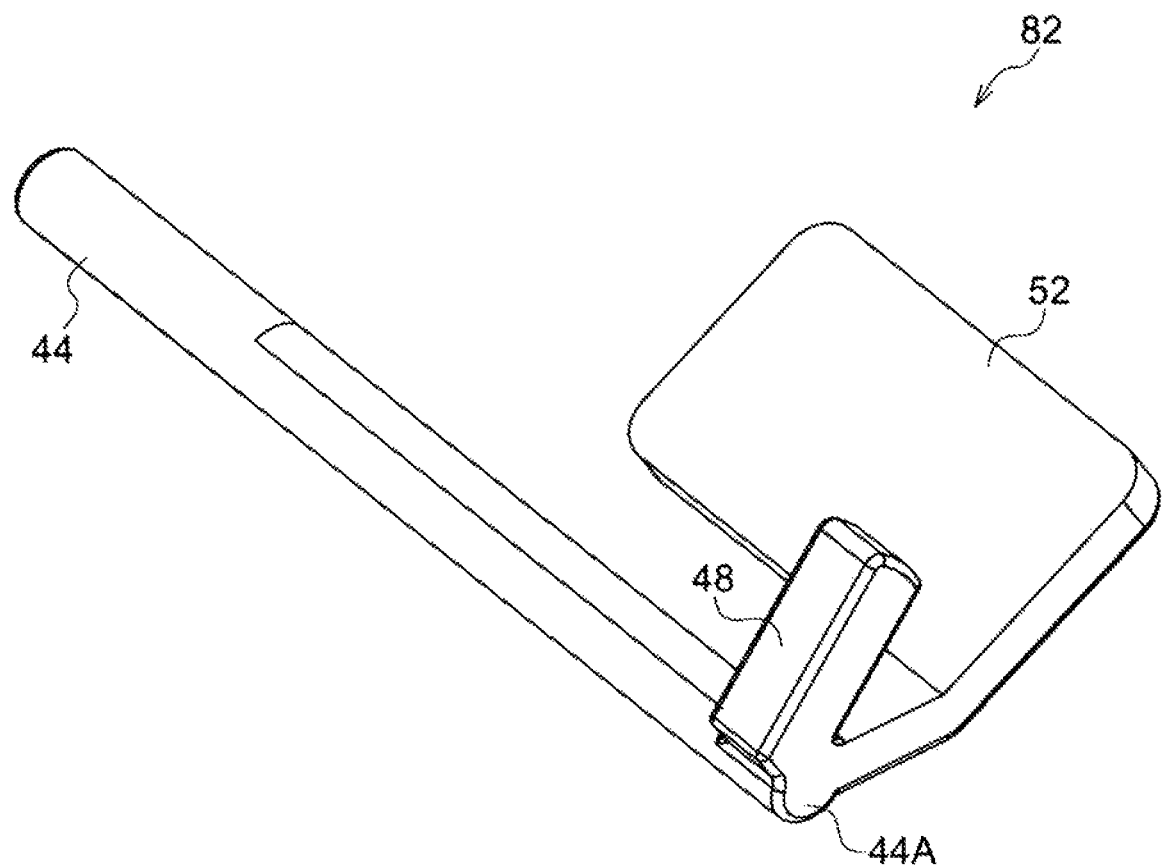
FIG. 24 is a perspective view showing a projecting member of an information processing apparatus of a second embodiment.
Figure 25:
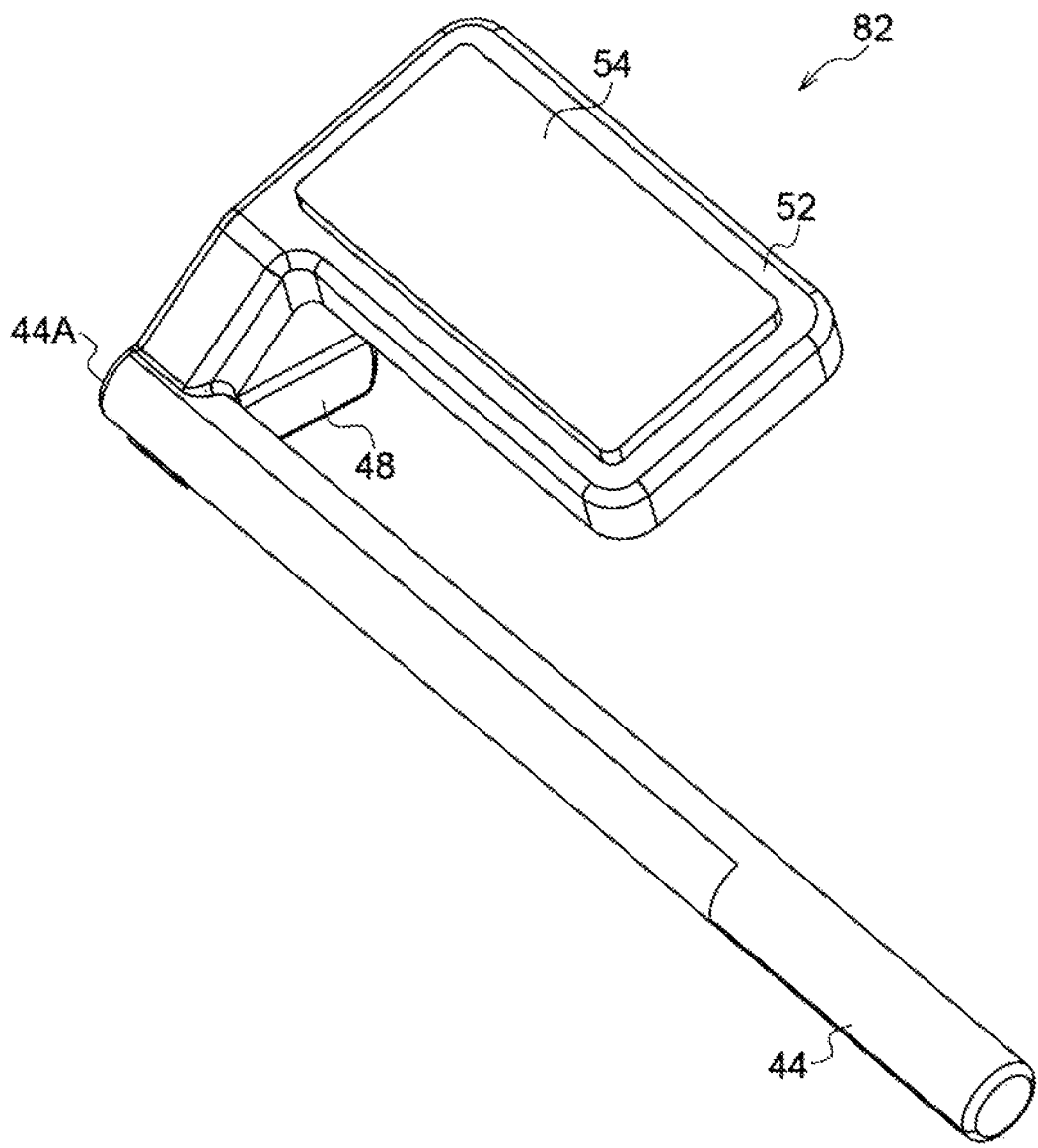
FIG. 25 is a perspective view showing the projecting member of the information processing apparatus of the second embodiment when inverted.
Figure 26:
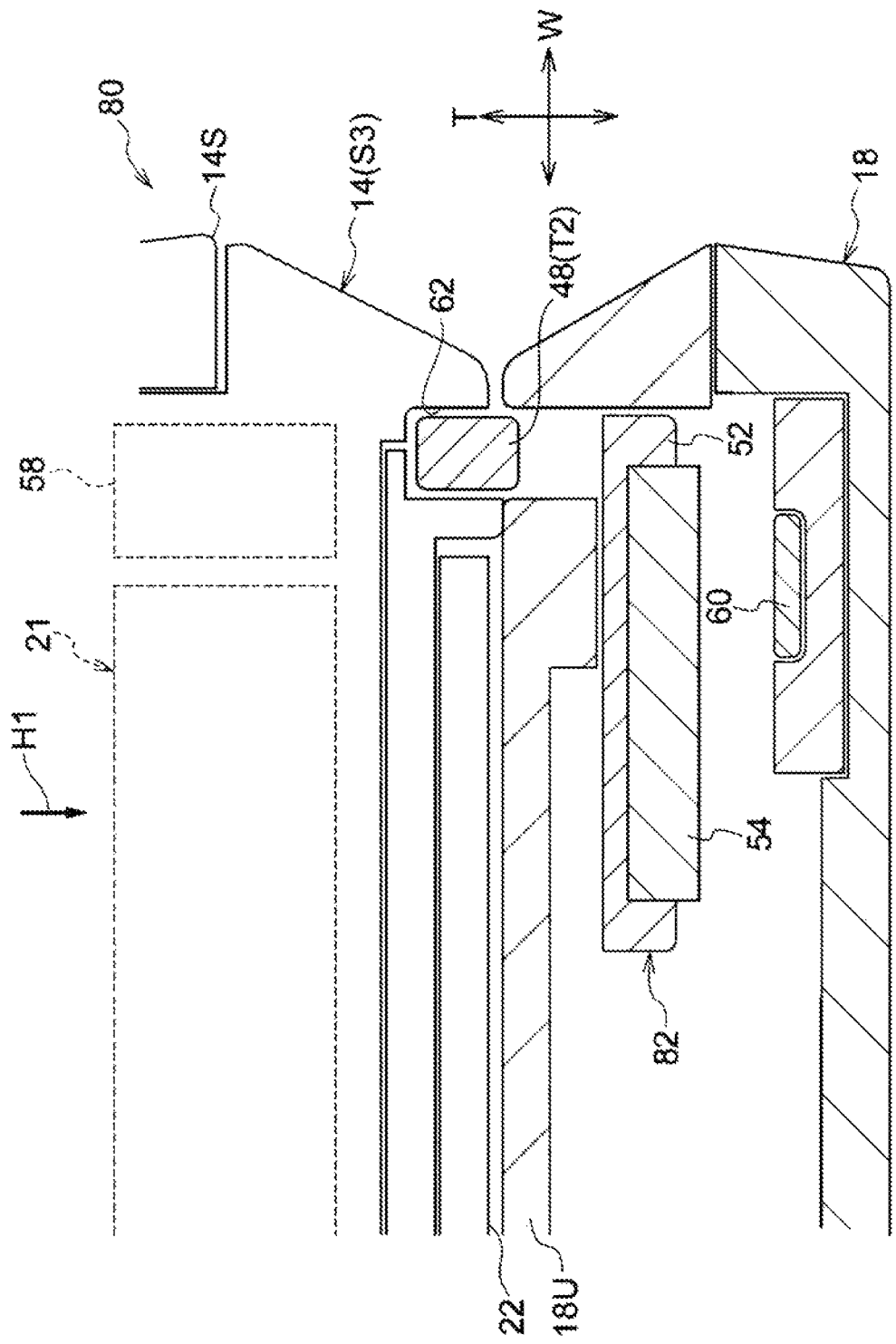
FIG. 26 is a cross-sectional view showing the tablet computer and the keyboard dock as an example of the information processing apparatus of the second embodiment in a closed state.

An information processing apparatus 80 of the second embodiment has a projecting member 82 having a shape as shown in FIGS. 24 and 25. In the projecting member 82, a holding plate 52 is formed on one end 44A side of a rotary shaft 44. In a state in which the projecting member 82 is attached to the keyboard 18, the holding plate 52, that is, a magnet 54, is positioned further outward in the width direction (the direction of the arrow W) than in the first embodiment as shown in FIG. 26.

In the information processing apparatus 80 of the second embodiment, a magnetic member 58 in the tablet 14 is also disposed on an outer side in the width direction, that is, at a position close to the short side 14S, in correspondence with the position of the holding plate 52. The position of the magnetic member 58 is on an outer side in the width direction, not overlapping the display unit 21 when viewed in the normal direction (the direction of the arrow H1). Therefore, the magnetic member 58 can be disposed on the display screen 22 side without being affected by the position of the display unit 21, on the side below in the closed state S3 of FIG. 26.

Thus, in the information processing apparatus 12 of the second embodiment, the magnetic member 58 can be disposed at a position close to the magnet of the keyboard 18 when the tablet 14 is in the closed state. Therefore, even if the magnetic force of the magnet 54 is weaker than in the first embodiment, the stopper 48 can be moved to the projecting position T2 by applying an attractive force between the magnet 54 and the magnetic member 58 in the closed state. Weakening of the magnetic force of the magnet 54 reduces the influence of the magnetic force on the surroundings.

In each of the above embodiments, the stoppers 48 move between the accommodation position T1 and the projecting position T2. At the accommodation position T1, each of the stoppers 48 is accommodated in the keyboard 18 and does not project from the keyboard 18, and therefore the stopper 48 does not cause an obstruction. Further, in the closed state S3, the stopper 48 is accommodated in the keyboard 18 and therefore the stopper 48 does not inadvertently come into contact with the tablet 14.

In addition, by taking the projecting position T2, the stopper 48 ensures that the tablet 14 is held in the first standing state S1 or the second standing state S2 or that the displacement is prevented in the closed state S3.

When the tablet 14 is in the closed state S3 with respect to the keyboard 18, the stopper 48 which is at the projecting position T2 is accommodated in the recess 62 of the tablet 14. In the case of a tablet without such a recess 62, it is also possible to prevent displacement of the tablet from a keyboard 18, for example, by bringing a stopper 48 into contact with an edge of the tablet. However, since the stopper 48 is simply brought into contact with the edge of the tablet 14, it is difficult to prevent the displacement if the tablet 14 is displaced in a direction away from the stopper. For example, to prevent the displacement in both directions (right and left directions) in the width direction of the tablet 14, it is necessary to bring a plurality of stoppers 48 into contact with the tablet 14 such that the tablet 14 is sandwiched therebetween in the width direction. To prevent the displacement in the depth direction of the tablet 14, it is necessary to bring a plurality of stoppers 48 into contact with the tablet 14 such that the tablet 14 is sandwiched therebetween in the depth direction.

On the other hand, in a structure in which the stopper 48 is accommodated in the recess 62 of the tablet 14 as in the above embodiments, the inner wall of the recess 62 surrounds the circumference of the stopper 48 which is at the projecting position T2. Therefore, it is possible to prevent the displacement in both the depth direction of the keyboard 18 (the direction of the arrow W) and the width direction (the direction of the arrow W).

In the present embodiment, the stopper 48 can be moved from the accommodation position T1 to the projecting position T2 due to a magnetic force between the magnet 54 and the magnetic members 56 and 58. Alternatively, it is possible to adopt, for example, a structure in which the position of the tablet 14 with respect to the keyboard 18 is detected by a sensor and the stopper 48 is moved to the projecting position T2 by an actuator if the tablet 14 is in a predetermined state. Use of a magnetic force as in the present embodiment can easily realize a structure for moving the stopper 48 to the projecting position T2.

The above embodiments have been described with reference to an example in which the magnet 54 is provided on the keyboard 18, that is, on the stopper 48 side, and the magnetic members 56 and 58 are provided on the tablet 14. However, conversely, a magnetic piece may be provided on the keyboard 18 and a magnet may be provided on the tablet 14. When a magnet is provided on the keyboard 18, it is possible to reduce the influence of the magnetic force on various members of the tablet 14 such as, for example, the display unit 21, the processor, and the memory.

The stopper 48 extends from the rotary shaft 44. Therefore, the stopper 48 can be moved between the accommodation position T1 and the projecting position T2 by the rotation of the rotary shaft 44. Alternatively, it is possible to adopt, for example, a structure in which the stopper 48 is slidably held relative to the keyboard 18 and is moved between the accommodation position and the projecting position by sliding. Use of the rotation of the rotary shaft 44 as in the above embodiments eliminates the necessity for the mechanism for sliding the stopper 48, thus simplifying the structure.

The holding plate 52 is provided on the rotary shaft 44 and a magnetic body (the magnet 54 in the above embodiment) is held on the holding plate 52. That is, it is possible to easily realize a structure in which the rotary shaft 44 and the magnetic body integrally rotate.

It is also possible to adopt a structure in which the stopper 48 doubles as the magnet 54. In this structure, it is not necessary to provide a holding plate and a magnet separately from the stopper 48, thus simplifying the structure. When the stopper 48 and the magnet 54 are provided separately as in each of the above embodiments, a material other than the magnet (magnetic body), for example, a resin, can be used as the stopper 48, thus increasing the degree of freedom of material selection. In addition, by forming the stopper 48 itself of a soft material or mounting a cover made of a rubber or a soft resin to the stopper 48, it is possible to prevent damage to other members due to contact with the stopper even if the members inadvertently come into contact with the stopper 48.

In the above embodiments, when the tablet 14 is in the first standing state S1, the tablet 14 is directed such that the first long side 14LA is parallel to the long sides 18L of the keyboard 18. The pair of stoppers 48A are arranged spaced apart in a direction along the long side 18L of the keyboard 18. Since the tablet 14 is held by a plurality of stoppers 48A at a plurality of locations, the tablet 14 can be stably held as compared with the structure in which it is held by one stopper. When the tablet 14 is in the second standing state S2, the tablet 14 is also held by the plurality of stoppers 48B at a plurality of locations and therefore the tablet 14 can be stably held as compared with structures in which it is held by one stopper.

In the keyboard 18, the stoppers 48 are provided at positions avoiding the key arrangement portion 24. Therefore, the stoppers 48 do not affect the arrangement of input keys 26 in the key arrangement portion 24. For example, it is possible to perform input operations on input keys 26 in the same manner as on a keyboard without the stoppers 48.

The key arrangement portion 24 is arranged at a position closer to the first long side 18LA among the two long sides of the keyboard 18. This widens the region E between the key arrangement portion 24 and the second long side 18LB and therefore the touchpad 28 can be provided in this region E. For example, to secure a space for providing the touchpad 28, it is not necessary to enlarge the keyboard 18.

The stoppers 48A and 48B are both disposed in the region E between the key arrangement portion 24 and the second long side 18LB. In states in which the stoppers 48A and 48B hold the tablet 14, that is, in the first standing state S1 and the second standing state S2, the tablet 14 covers the keyboard 18 and thus it is possible to prevent inadvertent contact with the keyboard 18.

The touchpad 28 is provided in the region E between the key arrangement portion 24 and the second long side 18LB as described above. By the touchpad 28, it is possible to perform input operations on the tablet 14.

Among the plurality of stoppers 48, the pair of stoppers 48A are provided in the region E1. The position of this region E1 is closer to the key arrangement portion 24 than the intermediate position CP between the key arrangement portion 24 and the second long side 18LB is. Therefore, in a state in which the tablet 14 is held by the stoppers 48A (the first standing state S1), the tablet 14 does not cover the touchpad 28 and all or part of the touchpad 28 is exposed and therefore it is possible to touch and operate the touchpad 28.

When the touchpad 28 is used as the second display screen 30, display content different from that of the display screen 22 can be displayed on the second display screen 30 such that the display content can be viewed. For example, the information processing apparatus 12 can also be operated using the second display screen 30 while display content different from that of the display screen 22 is being displayed on the second display screen 30.

Among the plurality of stoppers 48, the pair of stoppers 48B are provided in the region E2. The position of this region E2 is closer to the second long side 18LB than the intermediate position CP between the key arrangement portion 24 and the second long side 18LB is. Therefore, in a state in which the tablet 14 is held by the stoppers 48B (the second standing state S2), the tablet 14 covers the touchpad 28 and thus it is possible to prevent inadvertent contact with the touchpad 28.

The positions of the stoppers 48 are not limited to those described above. For example, a pair of stoppers 48 (projecting members 42) may be provided at intervals in the width direction at arbitrary positions in the region E in which the touchpad 28 is provided as shown in FIG. 2.

The speakers 64 are provided on the tablet 14. The speakers 64 are exposed from the keyboard 18 when the tablet 14 is in the first standing state S1 and the second standing state S2. That is, the fronts of the speakers 64 are not covered by the keyboard 18. Therefore, the sound quality is high compared to structures in which the fronts of the speakers 64 are covered by the keyboard 18.

It is also possible to adopt a structure in which a communication member which performs communication with external devices by wireless signals is provided in place of or in combination with the speakers 64. The communication member is exposed from the keyboard 18 and is provided at a position where a front surface of the communication member is not covered by the keyboard 18. This can prevent wireless signals from being blocked or attenuated by the keyboard 18. These wireless signals mentioned here are not particularly limited and include radio waves, visible light, infrared rays, ultraviolet rays, and the like. More specifically, a receiving unit, a light receiving unit of a remote controller or the like may be provided.

The information processing apparatus 12 of each of the above embodiments has the keyboard dock 16. That is, the keyboard 18 is connected to the tablet 14 by the connection plate 20 and, in the first standing state S1 and the second standing state S2, the connection plate 20 supports part of the load of the tablet 14. However, for example, as long as the tablet 14 in the first standing state S1 and the second standing state S2 can be supported only by the stoppers 48, it is possible to adopt a structure without the connection plate 20. For example, the connection plate 20 is unnecessary if part of the first long side 14LA of the tablet 14 is hooked to the stoppers 48 such that the fall of the tablet 14 in the direction of the arrow T3 can be prevented in the first standing state S1 and the second standing state S2. Then, it is possible to adopt a structure in which the stoppers 48 hold the tablet 14 in the first standing state S1 and the second standing state S2 and engage with the tablet 14 in the closed state S3 while the connection plate 20 is not provided in the structure.

In the above description, the tablet 14 which has the display screen 22 and internally has the processor is described as an example of a display. However, it is also possible to adopt a structure in which the processor is disposed inside the keyboard 18 and the display does not internally have the processor. That is, the processor of the information processing apparatus may be provided inside the display or may be provided inside the keyboard 18.

The information processing apparatus 12 is not limited to structures having the tablet 14 described above, which may also be, for example, a smartphone, a terminal for product management, an electronic dictionary, or a video reproduction device.

Although embodiments of the technology disclosed in the present application have been described above, the technology disclosed in the present application is not limited to those described above and various modifications other than those described above may, of course, be practiced without departing from the gist of the present invention.

What is claimed is:

1. An information processing apparatus comprising:
   a display having a first display screen;
   a keyboard having an input key; and
   a projecting member having a stopper, the projecting member being provided on the keyboard, the stopper being configured to hold the display in a standing state in which the display is standing up with respect to the keyboard, the stopper being configured to engage with the display in a closed state in which the display is closed,
   wherein the projecting member further has a rotary shaft rotatably attached to the keyboard and a holding plate that is provided on the rotary shaft, the holding plate holding a first magnetic body,
   the keyboard is provided with a second magnetic body and the display is provided with a third magnetic body,
   when the rotary shaft receives a first rotational force in a direction in which the stopper moves to an accommodation position, the stopper is accommodated in the keyboard due to a first magnetic force acting on the second magnetic body and the first magnet body, and
   when the rotary shaft receives a second rotational force in a direction in which the stopper moves to a projecting position, the stopper projects from the keyboard due to a second magnetic force acting on the third magnetic body and the first magnet body, and the second magnetic force is greater than the first magnetic force.

2. The information processing apparatus according to claim 1,
   wherein the display has a recess that accommodates the stopper which is at the projecting position in the closed state.

3. The information processing apparatus according to claim 1,
   wherein the keyboard has a rectangular shape having long sides and short sides in a plan view, and
   the stopper is configured with a plurality of stoppers that are arranged spaced apart in a direction along the long sides.

4. The information processing apparatus according to claim 3,
   wherein the keyboard includes a key arrangement portion in which a plurality of the input keys are arranged side by side, and
   each of the plurality of stoppers is provided at a position that is spaced apart from the key arrangement portion in the plan view.

5. The information processing apparatus according to claim 4,
   wherein the key arrangement portion is provided at a position close to a first long side among the long sides, and
   the plurality of stoppers are provided in a range between the key arrangement portion and a second long side among the long sides in the plan view.

6. The information processing apparatus according to claim 5,
   further comprising a touchpad disposed in the range.

7. The information processing apparatus according to claim 6,
   wherein the plurality of stoppers are provided at a position closer to the key arrangement portion than an intermediate position between the key arrangement portion and the second long side in the plan view.

8. The information processing apparatus according to claim 6,
   wherein the plurality of stoppers are provided at a position closer to the second long side than an intermediate position between the key arrangement portion and the second long side in the plan view.

9. The information processing apparatus according to claim 6,
   wherein the touchpad is configured to perform as a second display screen.

10. The information processing apparatus according to claim 1,
    wherein a speaker is provided on the display at a position where the speaker is exposed from the keyboard in the standing state.

11. The information processing apparatus according to claim 1,
    wherein a communication member configured to perform communication with outside of the display by a wireless signal is provided on the display at a position where the communication member is exposed from the keyboard in the standing state.

\* \* \* \* \*